United States Patent
Hancock et al.

(10) Patent No.: US 7,421,275 B1
(45) Date of Patent: *Sep. 2, 2008

(54) SYSTEM AND METHOD FOR LOCATING POINTS OF INTEREST USING A PORTABLE PHONE

(75) Inventors: S. Lee Hancock, Newport Beach, CA (US); Peter H. Dana, Georgetown, TX (US)

(73) Assignee: Civix-DDI, LLC, Delaplane, VA (US)

( * ) Notice: Subject to any disclaimer, the term of this patent is extended or adjusted under 35 U.S.C. 154(b) by 186 days.

This patent is subject to a terminal disclaimer.

(21) Appl. No.: 10/423,318

(22) Filed: Apr. 25, 2003

Related U.S. Application Data

(60) Division of application No. 10/172,288, filed on Jun. 13, 2002, now abandoned, which is a continuation of application No. 09/757,874, filed on Jan. 9, 2001, now Pat. No. 6,339,744, which is a continuation of application No. 09/540,398, filed on Mar. 31, 2000, now Pat. No. 6,223,122, which is a continuation of application No. 09/188,153, filed on Nov. 4, 1998, now Pat. No. 6,047,236, which is a continuation of application No. 08/701,586, filed on Aug. 22, 1996, now Pat. No. 5,839,088.

(51) Int. Cl.
*H04Q 7/20* (2006.01)
(52) U.S. Cl. ............. 455/456.1; 701/208; 701/200
(58) Field of Classification Search ...... 455/456.1–457; 342/357.06, 0.01, 357.1, 357.13; 701/200, 701/206, 207–213, 300
See application file for complete search history.

(56) References Cited

U.S. PATENT DOCUMENTS

| | | | |
|---|---|---|---|
| 3,614,328 | A | 10/1971 | McNaughton et al. |
| 4,677,561 | A | 6/1987 | Akama et al. |
| 4,706,081 | A | 11/1987 | Hart et al. |
| 4,714,995 | A | 12/1987 | Materna et al. |
| 4,757,267 | A | 7/1988 | Riskin |
| 4,866,704 | A | 9/1989 | Bergman |
| 4,872,157 | A | 10/1989 | Hemmady et al. |
| 4,872,158 | A | 10/1989 | Richards |
| 4,872,159 | A | 10/1989 | Hemmady et al. |
| 4,872,160 | A | 10/1989 | Hemmady et al. |
| 4,875,206 | A | 10/1989 | Nichols et al. |
| 4,894,824 | A | 1/1990 | Hemmady et al. |
| 4,896,319 | A | 1/1990 | Lidinsky et al. |
| 4,899,333 | A | 2/1990 | Roediger |
| 4,922,486 | A | 5/1990 | Lidinsky et al. |

(Continued)

OTHER PUBLICATIONS

US Patent No. 5,032,989 cited in Bayles Report filed in *CIVIX-DDI, LLC v. Expedia, Inc., et al*, Civil Action No. 03 C 3792 (N.D. Ill.).

(Continued)

*Primary Examiner*—George Eng
*Assistant Examiner*—Marcos L Torres
(74) *Attorney, Agent, or Firm*—Lathrop & Gage LC

(57) ABSTRACT

A method and apparatus for defining grid and proprietary addresses of selected locations within a geographical area is described, characterized in that the grid addresses are defined in relation to a grid and can be easily converted to global coordinates defined in relation to a known global referencing system, and the proprietary addresses are unique to the geographical area.

28 Claims, 17 Drawing Sheets

U.S. PATENT DOCUMENTS

| | | |
|---|---|---|
| 4,974,170 A | 11/1990 | Bouve et al. |
| 4,977,582 A | 12/1990 | Nichols et al. |
| 4,992,940 A | 2/1991 | Dworkin |
| 5,014,221 A | 5/1991 | Mogul |
| 5,032,989 A | 7/1991 | Tornetta |
| 5,095,480 A | 3/1992 | Fenner |
| 5,124,984 A | 6/1992 | Engel |
| 5,142,622 A | 8/1992 | Owens |
| 5,163,131 A | 11/1992 | Row et al. |
| 5,185,860 A | 2/1993 | Wu |
| 5,204,961 A | 4/1993 | Barlow |
| 5,212,645 A | 5/1993 | Wildes et al. |
| 5,214,694 A | 5/1993 | Furuya et al. |
| 5,224,098 A | 6/1993 | Bird et al. |
| 5,229,947 A | 7/1993 | Ross et al. |
| 5,243,596 A | 9/1993 | Port et al. |
| 5,265,239 A | 11/1993 | Ardolino |
| 5,289,195 A | 2/1994 | Inoue |
| 5,289,572 A | 2/1994 | Yano et al. |
| 5,296,861 A | 3/1994 | Knight |
| 5,311,434 A | 5/1994 | Tamai |
| 5,323,322 A | 6/1994 | Mueller et al. |
| 5,345,244 A | 9/1994 | Gildea et al. |
| 5,355,140 A | 10/1994 | Slavin et al. |
| 5,359,332 A | 10/1994 | Allison et al. |
| 5,384,835 A | 1/1995 | Wheeler et al. |
| 5,396,254 A * | 3/1995 | Toshiyuki .............. 342/357.13 |
| 5,406,491 A | 4/1995 | Lima |
| 5,418,538 A | 5/1995 | Lau |
| 5,422,814 A | 6/1995 | Sprague et al. |
| 5,424,951 A | 6/1995 | Nobe et al. |
| 5,436,632 A | 7/1995 | Sheynblat |
| 5,440,479 A | 8/1995 | Hutton et al. |
| 5,450,344 A | 9/1995 | Woo et al. |
| 5,452,217 A | 9/1995 | Kishi et al. |
| 5,471,392 A | 11/1995 | Yamashita |
| 5,477,458 A | 12/1995 | Loomis |
| 5,483,586 A | 1/1996 | Sussman |
| 5,506,897 A | 4/1996 | Moore et al. |
| 5,528,501 A | 6/1996 | Hanson |
| 5,533,107 A | 7/1996 | Irwin et al. |
| 5,543,789 A | 8/1996 | Behr et al. |
| 5,544,061 A * | 8/1996 | Morimoto et al. ........... 701/202 |
| 5,559,707 A | 9/1996 | DeLorme |
| 5,579,535 A | 11/1996 | Orlen et al. |
| 5,588,048 A | 12/1996 | Neville |
| 5,596,500 A | 1/1997 | Sprague et al. |
| 5,648,768 A | 7/1997 | Bouve |
| 5,682,525 A | 10/1997 | Bouve et al. |
| 5,689,809 A | 11/1997 | Grube et al. |
| 5,711,354 A | 1/1998 | Siegele et al. |
| 5,732,074 A | 3/1998 | Spaur |
| 5,786,789 A * | 7/1998 | Janky ...................... 342/357.1 |
| 5,796,634 A | 8/1998 | Craport et al. |
| 5,808,566 A | 9/1998 | Behr et al. |
| 5,839,088 A * | 11/1998 | Hancock et al. ............. 701/213 |
| 5,848,131 A | 12/1998 | Shaffer et al. |
| 5,848,373 A * | 12/1998 | DeLorme et al. ............ 701/200 |
| 5,878,126 A | 3/1999 | Velamuri et al. |
| 5,930,474 A | 7/1999 | Dunworth |
| 5,944,769 A | 8/1999 | Musk et al. |
| 5,956,509 A | 9/1999 | Kevner |
| 5,961,569 A | 10/1999 | Craport et al. |
| 5,978,733 A * | 11/1999 | Deshimaru et al. .......... 701/209 |
| 5,991,739 A | 11/1999 | Cupps et al. |
| 6,021,406 A | 2/2000 | Kuznetsov |
| 6,122,520 A * | 9/2000 | Want et al. ............... 455/456.2 |
| 6,339,744 B1 * | 1/2002 | Hancock et al. ............. 701/201 |
| 6,385,622 B2 | 5/2002 | Bouve et al. |
| 6,473,692 B2 | 10/2002 | Hancock et al. |
| 6,847,886 B2 * | 1/2005 | Demir et al. ................ 701/208 |
| 7,373,244 B2 * | 5/2008 | Kreft ......................... 701/207 |

OTHER PUBLICATIONS

AUTOMAP® PRO User Guide for Windows, Microsoft, 1988-1995.

Answer, Affirmative Defenses and Counterclaims of Defendant Orbitz, LLC to CIVIX's Second Amended Complaint; Civil Action No. 05 C 6869; Sep. 11, 2006.

YellowPages.Com LLC's Answer to Second Amended Complaint; Civil Action No. 05 C 6869; Sep. 8, 2006.

Yahoo! Inc.'s Answer and Counterclaims to CIVIX's Second Amended Complaint; Civil Action No. 05 C 6869; Sep. 11, 2006.

Answer, Affirmative Defenses and Counterclaims of Hotels.com, L.P. and Hotels.com GP, LLC; Civil Action No. 05 C 6869; Sep. 11, 2006.

Defendants National Association of Realtors and Homestore, Inc.'s Answer and Counterclaim to CIVIX-DDI, LLC's Second Amended Complaint; Civil Action No. 05 C 6869; Sep. 8, 2006.

Declaration of Robert Norton [Redacted], Dec. 13, 2006, Civil Action No. 05 C 6869.

"Starting today, the way you find a home will never be the same," HomeView, Inc. screen shots, Nov. 13, 1991, Exhibit 1 to the Declaration of Robert Norton.

"HomeViewTM Executive Summary," 1991, PicNet International, Inc., Exhibit 3 to the Declaration of Robert Norton.

"Homeview™ The Best Way to Buy Your Next Home," Custom Catalog printed for John and Mary Doe, Sep. 24, 1990, pp. 1-29, HomeView, Natick, MA, Exhibit 11 to the Declaration of Robert Norton.

"List your home with a HomeView Realtor® and start packing," 1992, HomeView, Inc., Exhibit 12 to the Declaration of Robert Norton.

"Finally, there's a better way to buy a home", 1992, HomeView, Inc., Exhibit 12 to the Declaration of Robert Norton, Exhibit 12 to the Declaration of Robert Norton.

"Finally, brokers get a break," HomeView™ Realty Search Centers brochure, 1991, HomeView, Inc., Exhibit 12 to the Declaration of Robert Norton.

"That was then. This is now." HomeView™ flyer, 1992, HomeView, Inc., Exhibit 12 to the Declaration of Robert Norton.

"Starting today, the way you find a home will never be the same." HomeView™ brochure, circa 1993, HomeView, Inc., Exhibit 12 to the Declaration of Robert Norton.

"A View With a Room," Entrepreneur, Mar. 1992, Exhibit 13 to the Declaration of Robert Norton.

"Home buyers shop using multimedia," USA Today, Oct. 2, 1992, Exhibit 13 to the Declaration of Robert Norton.

"High-Tech Home Buying," Newsweek, p. 5, Jun. 1, 1992, Exhibit 13 to the Declaration of Robert Norton.

Cove, Lynda, "A new meaning to home delivery," The Boston Herald, Real Estate Pullout Section, Jan. 10, 1992, Exhibit 13 to the Declaration of Robert Norton.

"Century 21 Dwyer & Stilton is Member Broker with Home View," Hanover South Shore News, Sep. 28, 1992, Exhibit 13 to the Declaration of Robert Norton.

"What's New," Popular Science, p. 16, May 1992, Exhibit 13 to the Declaration of Robert Norton.

"Homeview announces equity investment by IBM," HomeView™ Realty Search Services press release, Sep. 16, 1992, Exhibit 13 to the Declaration of Robert Norton.

Brickman, Sue, "House hunting," Real Estate Update, Jan. 17, 1992, Exhibit 13 to the Declaration of Robert Norton.

"Home-Shopping Networks," Inc., p. 53, Mar. 1993, Exhibit 13 to the Declaration of Robert Norton.

Labanca, Lisa, "IBM backing HomeView," Middlesex News, Sep. 17, 1992, Exhibit 13 to the Declaration of Robert Norton.

Rosenberg, Ronald and Ackerman, Jerry, "IBM Moves into HomeView," The Boston Globe, Sep. 16, 1992, Exhibit 13 to the Declaration of Robert Norton.

"Joyce Cook Realtors adopts HomeView," Salem Evening News, Business Highlights, Sep. 18, 1992, Exhibit 13 to the Declaration of Robert Norton.

"Virtual Real Estate," Lear's, May 1992, Exhibit 13 to the Declaration of Robert Norton.
Barrett, Bob, "Home buyers: Let your fingers do the walking," The Patriot Ledger, Dec. 20, 1991, Exhibit 13 to the Declaration of Robert Norton.
"Looking for a House on a Computer Screen," The Wall Street Journal Marketplace, Mar. 23, 1992, Exhibit 13 to the Declaration of Robert Norton.
"Marblehead Proprerties [sic.] part of computer database," Swampscott Reporter, Sep. 3, 1992, Exhibit 13 to the Declaration of Robert Norton.
Bianchi, Alessandra, "Home-Shopping Networks," New Businesses, Inc., p. 53, Mar. 1993, Exhibit 13 to the Declaration of Robert Norton.
"Home Finder," Popular Science, vol. 240, No. 5, May 1992, Exhibit 13 to the Declaration of Robert Norton.
"Realtor joins digital sales service," Haverhill Gazette, Sep. 9, 1992, Exhibit 13 to the Declaration of Robert Norton.
Eng, Paul M., Ed., "Three Bedrooms, River View? I'll Punch That Right Up," Business Week, Jan. 20, 1992, Exhibit 13 to the Declaration of Robert Norton.
"The Home-Shopping Network," CIO The Magazine for Information Executives, Mar. 1992, Exhibit 13 to the Declaration of Robert Norton.
Phelps, Dan, "A unique way to search for a home," Needham Times, vol. 25, No. 4, Jan. 16, 1992, Exhibit 13 to the Declaration of Robert Norton.
"Home buyers shop using multimedia," USA Today, Oct. 2, 1992, Exhibit 13 to the Declaration of Robert Norton.
"Front-runners: The Victor Company, Inc. Realtor offices are now HomeView member brokers," The Eagle-Tribune, Sep. 25, 1992, Exhibit 13 to the Declaration of Robert Norton.
Ackerman, Jerry, "Zap! Real estate shopping meets the computer age," The Boston Sunday Globe, Nov. 22, 1992, Exhibit 13 to the Declaration of Robert Norton.
Banks, Michael A., "The Modem Reference" Third Edition, Brady Publishing, 1992.
Litchy, Tom, "The Official America Online" Second Edition, Ventana Press, 1994.
Magio, Larry, "Cruising Online" Random House 1994.
Tweney, Dylan, "Traveler's Guide To The Information Highway" Ziff Davis Press, 1994.
Wilder, Floyd, "A Guide To The TCP/IP Protocal Suite" Artech House, Inc., 1993.
Hiawath, Bray, "Microsoft's New Software Clicks For the Folks Who Don't Do Windows" Night Ridder/Tribune News Services. Jan. 18, 1995, pp. 1-2.
*Civix-DDI, LLC* v. *National Association of Realtors, Homestore, Inc., Hotels.com, L.P., Hotels.com GP LLC and Yahoo! Inc.*, Case No. 05 CV 6869 (N.D. Ill.), Case Docket and Statement of Judge St. Eve dated Sep. 17, 20076, pp. 1-5.
Godwin, Nadine, Sabre to Allow Its Subscribers to Load Others' PC Software, Travel Weekly, 1989, pp. 1-2.
Michael Banks, The Modem Reference, Third Edition, Brady Publishing, 1992.
Steven Putz, Interactive Information Services Using World-Wide Web Hypertext, First International Conference on World-Wide Web ISTL-QCA-1994-03-01, 1994.
David Crossley and Tony Boston, A Generic Map Interface to Query Geographic Information Using the World Wide Web, www.w3j.com/1/Crossley 002/paper/002.html, 1993.
Ed Taylor. Demystifying TCP/IP. Woodware Publishing, Inc., 1993.
GIS Approach to Digital Spatial Libraries, ESRI, 1994.
H.G. Campbell, Geographic Information Systems Education for Non-Computer Oriented College Students, SIGCSE Bulletin, 1994.
CompuServe Made Easy, Mentor Technologies, 1992.
Lawrence Magid, Cruising Online, Random House, 1994.
Dylan Tweney, The Traveler's Guide to the Information Highway, Ziff Davis Press, 1994.
David Carson, The Online Timeline, iml.jou.ufl.edu/carlson/1990s/shtml, 1999.
Office Action dated Jul. 13, 2001 issued in related U.S. Appl. No. 09/757,874.
Response to Office Action dated Jul. 13, 2001 issued in related U.S. Appl. No. 09/757,874, filed Jul. 24, 2001.
Office Action dated Aug. 2, 2001 issued in related U.S. Appl. No. 09/757,874.
Response to Office Action dated Aug. 2, 2001 issued in related U.S. Appl. No. 09/757,874, filed Aug. 6, 2001.
Supplemental Response to Office Action dated Aug. 2, 2001 issued in related U.S. Appl. No. 09/757,874, filed Aug. 9, 2001.
Notice of Allowance dated Oct. 11, 2001 issued in related U.S. Appl. No. 09/757,874.
Barbara Sturken, American Introduces Commercial Sabre, Travel Weekly, 1986.
Werner Hafner, Tripping Through Online Travel Services, Fairfield County Business Journal—High Beam Research 1992.
Vic Sussman, The Internet Will Gain Popularity, Problems, U.S. News and World Report, 1994.
Rillings, J.H., et al, "TravTek," Vehicle Navigation & Information Systems Conference Proceedings, Society of Automotive Engineers, at 729-38 Warrendale, PA (1991).
Stephen Loudermilk, Wireless Communications Devices on Tap; 1993 Comdex Tradeshow in Las Vegas, PC Week, Nov. 15, 1993.
Cellular Radio Systems, edited by Balston, D.M. (Artech House Boston) (1993), pp. 295-297).
Levy S., et al, "Telnet X.3 PAD Option," RFC1053 (Apr. 1998) available at www.ietf.org/rfc1053.txt.
Obraczka, P.B. Danzig, and S.H. Li, Internet Resource Discovery Services, 26 IEEE Computer, No. 9, pp. 8-24 (Sep. 1993).
"Hilton Head fires up cellular data network—Sea Pines Forest Beach Fire Department," Communication News, Oct. 1993, available at http:www.findarticles.com/p/articles/mi_m0CMN/is_v30/ai_14457790.
Civil Action No. 05 C 6869: Homestore's Fourth Supplemental Response to Civix's Interrogatory No. 3 and Fourth Supplemental Response to Civix's Interrogatory No. 9, Aug. 17, 2007, 386 pages.

* cited by examiner

```
AK,ANC,ANCHORAGE,149W54,61N13
AK,FBK,FAIRBANKS,147W43,64N51
AK,JUN,JUNEAU,134W24,58N18
AL,ANN,ANNISTON,085W50,33N39
AL,BES,BESSEMER,086W58,33N24
AL,BIR,BIRMINGHAM,086W48,33N31
AL,DEC,DECATUR,086W59,34N36
AL,DOT,DOTHAN,085W24,31N13
AL,FLO,FLORENCE,087W41,34N48
AL,GAD,GADSDEN,086W01,34N01
AL,HUN,HUNTSVILLE,086W35,34N44
AL,MOB,MOBILE,088W03,30N41
AL,MON,MONTGOMERY,086W19,32N23
AL,PHE,PHENIX CITY,085W00,32N28
AL,PRI,PRICHARD,088W05,30N44
AL,SEL,SELMA,087W01,32N25
AL,TUS,TUSCALOOSA,087W34,33N12
AR,EDO,EL DORADO,092W40,33N12
AR,FAY,FAYETTEVILLE,096W10,36N04
AR,FTS,FORT SMITH,094W25,35N23
AR,HOS,HOT SPRINGS NAT PA,093W03,34N31
AR,JON,JONESBORO,090W42,35N50
AR,LRK,LITTLE ROCK,092W17,34N45
AR,NLR,NORTH LITTLE ROCK,092W16,34N46
AR,PIB,PINE BLUFF,092W01,34N13
AR,WME,WEST MEMPHIS,090W11,35N09
AZ,FLA,FLAGSTAFF,111W39,35N12
AZ,GCN,GRAND CANYON,112W8,36N59
AZ,GLD,GLENDALE,112W11,33N32
AZ,MES,MESA,111W50,33N25
AZ,PHO,PHOENIX,112W04,33N27
AZ,SCO,SCOTTSDALE,111W56,33N29
AZ,TEM,TEMPE,111W56,33N25
AZ,TUC,TUCSON,110W58,32N13
AZ,YMA,YUMA,114W37,32N43
CA,ALA,ALAMEDA,122W15,37N46
CA,ALH,ALHAMBRA,118W06,34N08
CA,ALT,ALTADENA,118W08,34N11
CA,ANA,ANAHEIM,117W55,33N50
CA,ANT,ANTIOCH,121W48,38N01
CA,ARA,ACADIA,118W12,34N08
CA,ARD,ARDEN,121W23,38N36
CA,ARE,ARCADE,118W01,34N08
CA,AZU,AZUSA,117W52,34N08
CA,BAK,BAKERSFIELD,119W01,35N23
CA,BAP,BALDWIN PARK,117W58,34N04
CA,BBK,BURBANK,118W19,34N11
CA,BEF,BELLFLOWER,118W09,33N53
CA,BEG,BELL GARDENS,118W10,33N58
CA,BEL,BELL,118W11,33N59
CA,BEV,BEVERLY HILLS,118W25,34N04
```

*Fig. 8A*

CA,BMT,BELMONT,122W16,37N31
CA,BRK,BERKELEY,122W16,37N52
CA,BUP,BUENA PARK,117W60,32N52
CA,BUR,BURLINGAME,112W21,37N35
CA,CAM,CAMPBELL,121W57,37N17
CA,CAR,CARMICHAEL,121W19,38N38
CA,CAR,CARSON,118W17,33N48
CA,CAV,CASTRO VALLEY,122W04,37N42
CA,CHI,CHINO,117W41,34N01
CA,CHV,CHULA VISTA,117W05,32N39
CA,CIH,CITRUS HEIGHTS,121W17,38N42
CA,CLA,CLAREMONT,117W43,34N06
CA,COL,COLTON,117W19,34N04
CA,CMP,COMPTON,118W13,33N54
CA,COM,COSTA MESA,117W55,33N38
CA,CON,CONCORD,122W02,37N59
CA,COV,COVINA,117W52,34N05
CA,CRN,CORONA,117W34,33N53
CA,CRO,CORONADO,117W10,32N41
CA,CUC,CULVER CITY,118W25,34N01
CA,CYP,CYPRESS,118W02,33N50
CA,DAC,DALY CITY,122W28,37N42
CA,DAV,DAVIS,121W44,38N32
CA,DOW,DOWNEY,118W08,33N56
CA,ECA,EL CAJON,116W58,32N48
CA,ECE,EL CERRITO,122W19,37N55
CA,ELA,EAST LOS ANGELES,118W09,34N01
CA,EMT,EL MONTE,122W00,37N59
CA,ESC,ESCONDIDO,117W05,33N07
CA,EUR,EUREKA,124W09,40N47
CA,FAI,FAIRFIELD,122W03,38N15
CA,FLO,FLORENCE,118W15,33N58
CA,FON,FONTANA,117W26,34N06
CA,FOV,FOUNTAIN VALLEY,117W58,33N42
CA,FRE,FREMONT,121W57,37N32
CA,FRS,FRESNO,119W47,36N44
CA,FUL,FULLERTON,117W56,33N53
CA,GAG,GARDEN GROVE,117W55,33N47
CA,GAR,GARDENA,118W1818,33N53
CA,GLD,GLENDALE,118W15,34N09
CA,GLE,GLENDORA,117W52,34N08
CA,HAH,HACIENDA HEIGHTS,117W58,33N58
CA,HAW,HAWTHORNE,118W21,33N55
CA,HAY,HAYWARD,122W05,37N40
CA,HIC,HILLCREST CENTER,118W57,35N23
CA,HOL,HOLLYWOOD,118W21,34N06
CA,HUB,HUNTINGTON BEACH,118W05,33N40
CA,HUP,HUNTINGTON PARK,118W14,33N59
CA,IMB,IMPERIAL BEACH,117W08,32N35
CA,ING,INGLEWOOD,118W21,33N58
CA,LA_,LOS ANGELES,118W15,34N04

*Fig. 8B*

AK,ALASKA
AL,ALABAMA
AR,ARKANSAS
AZ,ARIZONA
CA,CALIFORNIA
CO,COLORADO
CT,CONNECTICUT
DC,DISTRICT OF COLUMBIA
DE,DELAWARE
FL,FLORIDA
GA,GEORGIA
HI,HAWAII
IA,IOWA
ID,IDAHO
IL,ILLINOIS
IN,INDIANA
KS,KANSAS
KY,KENTUCKY
LA,LOUISIANA
MA,MASSACHUSETTS
MD,MARYLAND
ME,MAINE
MI,MICHIGAN
MN,MINNESOTA
MO,MISSOURI
MS,MISSISSIPPI
MT,MONTANA
NC,NORTH CAROLINA
ND,NORTH DAKOTA
NE,NEBRASKA
NH,NEW HAMPSHIRE
NJ,NEW JERSEY
NM,NEW MEXICO
NV,NEVADA
NY,NEW YORK
OH,OHIO
OK,OKLAHOMA
OR,OREGON
PA,PENNSYLVANIA
RI,RHODE ISLAND
SC,SOUTH CAROLINA
SD,SOUTH DAKOTA
TN,TENNESSEE
TX,TEXAS
UT,UTAH
VA,VIRGINIA
VT,VERMONT
WA,WASHINGTON
WI,WISCONSIN
WV,WEST VIRGINIA
WY,WYOMING

*Fig. 9*

US.CA.NWB.MAC2,117W52.360,33N39.549,MCDONALDS #2
US.CA.NWB.BK2,117W52.425,33N39.647,BURGER KING #2
US.CA.NWB.ARCO,117W52.459,33N39.681,ARCO
US.CA.NWB.DLTC2,117W52.513,33N39.679,DEL TACO #2
US.CA.NWB.CHVRN,117W52.557,33N39.701,CHEVRON
US.CA.NWB.JACK1,117W54.800,33N37.895,JACK-IN-THE-BOX #1
US.CA.NWB.MAC1,117W54.837,33N36.987,MCDONALDS #1
US.CA.NWB.TACO,117W55.280,33N38.278,TACO BELL
US.CA.NWB.DLTC1,117W55.354,33N38.204,DEL TACO #1
US.CA.NWB.MAC3,117W52.360,33N39.549,MCDONALDS #3
US.CA.NWB.BK1,117W52.425,33N39.647,BURGER KING #1
US.CA.NWB.ARCO,117W52.459,33N39.681,ARCO #1
US.CA.NWB.DLTC3,117W52.513,33N39.679,DEL TACO #3
US.CA.NWB.CHVRN1,117W52.557,33N39.701,CHEVRON #2
US.CA.NWB.JACK2,117W54.800,33N37.895,JACK-IN-THE-BOX #2
US.CA.NWB.MAC4,117W54.837,33N36.987,MCDONALDS #4
US.CA.NWB.TACO1,117W55.280,33N38.278,TACO BELL #1
US.CA.NWB.DLTC4,117W55.354,33N38.204,DEL TACO #4
US.CA.NWB.MAC5,117W52.360,33N39.549,MCDONALDS #5
US.CA.NWB.BK3,117W52.425,33N39.647,BURGER KING #3
US.CA.NWB.ARCO2,117W53.129,33N40.871,ARCO #2
US.CA.NWB.DLTC5,117W52.625,33N39.811,DEL TACO #5
US.CA.NWB.CHVRN3,117W52.247,33N39.642,CHEVRON #3
US.CA.NWB.JACK3,117W53.74,33N38.25,JACK-IN-THE-BOX #3
US.CA.NWB.MAC6,17W53.157,33N37.1,MCDONALDS #6
US.CA.NWB.TACO2,117W54.872,33N38.657,TACO BELL #2
US.CA.NWB.DLTC6,117W55.144,33N39.975,DEL TACO #6
US.CA.NWB.MAC7,117W52.360,33N39.549,MCDONALDS #7
US.CA.NWB.BK4,117W52.425,33N39.647,BURGER KING #4
US.CA.NWB.ARCO3,117W51.824,33N39.47,ARCO #3
US.CA.NWB.DLTC7,117W52.851,33N39.487,DEL TACO #7
US.CA.NWB.CHVRN4,117W52.557,33N39.701,CHEVRON #4
US.CA.NWB.JACK4,117W54.800,33N37.895,JACK-IN-THE-BOX #4
US.CA.NWB.MAC8,117W54.837,33N36.987,MCDONALDS #8
US.CA.NWB.TACO3,117W55.28,33N38.278,TACO BELL #3
US.CA.NWB.DLTC8,117W55.354,33N38.204,DEL TACO #8

US.CA.NWB.TEXCO,117W52.360,33N39.549,TEXACO
US.CA.NWB.GULF,117W52.425,33N39.647,GULF OIL
US.CA.NWB.ARBY,117W52.459,33N39.681,ARBY'S
US.CA.NWB.DENNY,117W52.513,33N39.679,DENNY'S
US.CA.NWB.PZHUT,117W52.557,33N39.701,PIZZA HUT
US.CA.NWB.PZINN,117W54.800,33N37.895,PIZZA INN
US.CA.NWB.PENNY,117W54.837,33N36.987,J.C. PENNY'S
US.CA.NWB.KFC1,117W55.280,33N38.278,KENTUCKY FRIED CHICKEN
US.CA.NWB.PZAPZA,117W55.354,33N38.204,LIL' CAESAERS
US.CA.NWB.SUB,117W52.360,33N39.549,SUBWAY
US.CA.NWB.WNDY,117W52.425,33N39.647,WENDY'S
US.CA.NWB.WELLS,117W52.459,33N39.681,WELL'S FARGO

*Fig. 10A*

US.CA.NWB.STAR,117W52.513,33N39.679,DEL STAR ATM
US.CA.NWB.MAIL,117W52.557,33N39.701,MAILBOX
US.CA.NWB.GMC,117W54.800,33N37.895,GENERAL MOTORS DEALER
US.CA.NWB.FORD,117W52.837,33N36.987,FORD DEALER
US.CA.NWB.MBZ,117W55.280,33N38.278,MERCEDES BENZ DEALER
US.CA.NWB.LEXUS,117W55.354,33N38.204,LEXUS DEALER
US.CA.NWB.S711,117W52.360,33N39.549,7-11
US.CA.NWB.CIRK,117W52.425,33N39.647,CIRCLE K STORE
US.CA.NWB.BOFA,117W52.459,33N39.681,BANK OF AMERICA
US.CA.NWB.ANW,117W52.513,33N39.679,A AND W RESTAURANT

US.CA.SAN.MAC2,117W52.360,33N49.549,MCDONALDS #2
US.CA.SAN.BK2,117W52.425,33N49.647,BURGER KING #2
US.CA.SAN.ARCO,117W52.459,33N49.681,ARCO
US.CA.SAN.DLTC2,117W52.513,33N49.679,DEL TACO #2
US.CA.SAN.CHVRN,117W52.557,33N49.701,CHEVRON
US.CA.SAN.JACK1,117W54.800,33N47.895,JACK-IN-THE-BOX #1
US.CA.SAN.MAC1,117W54.837,33N46.987,MCDONALDS #1
US.CA.SAN.TACO,117W55.280,33N48.278,TACO BELL
US.CA.SAN.DLTC1,117W55.280,33N48.204,DEL TACO #1
US.CA.SAN.MAC3,117W52.360,33N49.549,MCDONALDS #3
US.CA.SAN.BK1,117W52.425,33N49.647,BURGER KING #1
US.CA.SAN.ARCO1,117W52.459,33N49.681,ARCO #1
US.CA.SAN.DLTC3,117W52.513,33N49.679,DEL TACO #3
US.CA.SAN.CHVRN1,117W52.557,33N49.701,CHEVRON #2
US.CA.SAN.JACK2,117W54.800,33N47.895,JACK-IN-THE-BOX #2
US.CA.SAN.MAC4,117W54.837,33N46.987,MCDONALDS #4
US.CA.SAN.TACO1,117W55.280,33N48.278,TACO BELL #1
US.CA.SAN.DLTC4,117W55.354,33N48.204,DEL TACO #4
US.CA.SAN.MAC5,117W52.360,33N49.549,MCDONALDS #5
US.CA.SAN.BK3,117W52.425,33N49.647,BURGER KING #3
US.CA.SAN.ARCO2,117W52.459,33N49.681,ARCO #2
US.CA.SAN.DLTC5,117W52.513,33N49.679,DEL TACO #5
US.CA.SAN.CHVRN3,117W52.557,33N49.701,CHEVRON #3
US.CA.SAN.JACK3,117W54.800,33N47.895,JACK-IN-THE-BOX #3
US.CA.SAN.MAC6,117W54.837,33N46.987,MCDONALDS #6
US.CA.SAN.TACO2,117W55.280,33N48.278,TACO BELL #2
US.CA.SAN.DLTC6,117W55.354,33N48.204,DEL TACO #6
US.CA.SAN.MAC7,117W52.360,33N49.549,MCDONALDS #7
US.CA.SAN.BK4,117W52.425,33N49.647,BURGER KING #4
US.CA.SAN.ARCO3,117W52.459,33N49.681,ARCO #3
US.CA.SAN.DLTC7,117W52.513,33N49.647,DEL TACO #7
US.CA.SAN.CHVRN4,117W52.557,33N49.701,CHEVRON #4
US.CA.SAN.JACK4,117W54.800,33N47.895,JACK-IN-THE-BOX #4
US.CA.SAN.MAC8,117W54.837,33N46.987,MCDONALDS #8
US.CA.SAN.TACO3,117W55.280,33N48.278,TACO BELL #3
US.CA.SAN.DLTC8,117W55.354,33N48.204,DEL TACO #8

US.CA.YSM.WWNA,119W39.23,37N32.20,WAWONA LODGE
US.CA.YSM.TLME,119W21.54,37N52.32,TUOLUMNE MEADOWS

*Fig. 10B*

```
US.CA.YSM.HFDM,119W31.56,37N44.84,HALF DOME
US.CA.YSM.HCHY,119W47.37,37N56.78,HETCH HETCY RESERVOIR
US.CA.YSM.BDGP,119W39.72,37N40.25,BADGER PASS
US.CA.YSM.MRPG,119W36.13,37N30.77,MARIPOSA GROVE
US.CA.YSM.SENT,119W37.96,37N30.12,SOUTH ENTRANCE
US.CA.YSM.NENT,119W52.54,37N48.69,NORTH ENTRANCE
US.CA.YSM.WENT,119W46.21,37N40.64,WEST ENTRANCE
US.CA.YSM.EENT,119W15.57,37N54.38,EAST ENTRANCE
US.CA.YSM.WWLF,119W38.73,37N52.35,WHITE WOLF
US.CA.YSM.GCRP,119W34.30,37N43.67,GLACIER POINT
US.CA.YSM.YSMF,119W37.12,37N45.34,YOSEMITE FALLS

US.CA.YSM.GGG1,119W39.23,37N32.20,WAWONA LODGE
US.CA.YSM.GGG2,119W21.54,37N52.32,TUOLUMNE MEADOWS
US.CA.YSM.GGG3,119W31.56,37N44.84,HALF DOME
US.CA.YSM.GGG4,119W47.37,37N56.78,HETCH HETCHY RESERVOIR
US.CA.YSM.GGG5,119W39.72,37N40.25,BADGER PASS
US.CA.YSM.GGG6,119W36.13,37N30.77,MARIPOSA GROVE
US.CA.YSM.GGG7,119W37.96,37N30.12,SOUTH ENTRANCE
US.CA.YSM.GGG8,119W52.54,37N48.69,NORTH ENTRANCE
US.CA.YSM.GGG9,119W46.21,37N40.64,WEST ENTRANCE
US.CA.YSM.GGG10,119W15.57,37N54.38,EAST ENTRANCE
US.CA.YSM.GGG11,119W38.73,37N52.35,WHITE WOLF
US.CA.YSM.GGG12,119W34.30,37N43.67,GLACIER POINT
US.CA.YSM.GGG13,119W37.12,37N45.34,YOSEMITE FALLS

US.CA.YSM.G1,119W39.23,37N32.20,WAWONA LODGE
US.CA.YSM.G2,119W21.54,37N52.32,TUOLUMNE MEADOWS
US.CA.YSM.G3,119W31.56,37N44.84,HALF DOME
US.CA.YSM.G4,119W47.37,37N56.78,HETCH HETCHY RESERVOIR
US.CA.YSM.G5,119W39.72,37N40.25,BADGER PASS
US.CA.YSM.G6,119W36.13,37N30.77,MARIPOSA GROVE
US.CA.YSM.G7,119W37.96,37N30.12,SOUTH ENTRANCE
US.CA.YSM.G8,119W52.54,37N48.69,NORTH ENTRANCE
US.CA.YSM.G9,119W46.21,37N40.64,WEST ENTRANCE
US.CA.YSM.G10,119W15.57,37N54.38,EAST ENTRANCE
US.CA.YSM.G11,119W38.73,37N52.35,WHITE WOLF
US.CA.YSM.G12,119W34.30,37N43.67,GLACIER POINT
US.CA.YSM.G13,119W37.12,37N45.34,YOSEMITE FALLS

US.CA.YSB.HFDM,119W31.56,37N44.84,HALF DOME
US.CA.YSB.YSMF,119W37.12,37N45.34,YOSEMITE FALLS
US.CA.YSB.GGG1,119W34.23,37N44.73,AHWAHNEE HOTEL
US.CA.YSB.GCRP,119W34.30,37N43.67,GLACIER POINT
```

*Fig. 10C*

AD,ANDORRA
AE,UNITED ARAB EMIRATES
AF,AFGHANISTAN
AG,ANTIGUA AND BARBUDA
AI,ANGUILLA
AL,ALBANIA
AM,ARMENIA
AN,NETHERLANDS ANTILLES
AO,ANGOLA
AQ,ANTARCTICA
AR,ARGENTINA
AS,AMERICAN SAMOA
AT,AUSTRIA
AU,AUSTRALIA
AW,ARUBA
AZ,AZERBAIJAN
BA,BOSNIA AND HERZEGOVINA
BB,BARBADOS
BD,BANGLADESH
BE,BELGIUM
BF,BURKINA FASO
BG,BULGARIA
BH,BAHRAIN
BI,BURUNDI
BJ,BENIN
BM,BERMUDA
BN,BRUNEI DARUSSALAM
BO,BOLIVIA
BR,BRAZIL
BS,BAHAMAS
BT,BHUTAN
BV,BOUVET ISLAND
BW,BOTSWANA
BY,BELARUS
BZ,BELIZE
CA,CANADA
CC,COCOS (KEELING) ISLANDS
CF,CENTRAL AFRICAN REPUBLIC
CG,CONGO
CH,SWITZERLAND
CI,COTE D'IVOIRE (IVORY COAST)
CK,COOK ISLANDS
CL,CHILE
CM,CAMEROON
CN,CHINA
CO,COLOMBIA
CR,COSTA RICA
CS,CZECHOSLOVAKIA (FORMER)
CU,CUBA
CV,CAPE VERDE
CX,CHRISTMAS ISLAND

*Fig. 11*

SYSTEM AND METHOD FOR LOCATING POINTS OF INTEREST USING A PORTABLE PHONE

This application is a divisional of U.S. application Ser. No. 10/172,288, filed Jun. 13, 2002, now abandoned which is a continuation of U.S. Ser. No. 09/757,874, filed on Jan. 9, 2001, now U.S. Pat. No. 6,339,744, which is a continuation of U.S. Ser. No. 09/540,398, filed on Mar. 31, 2000, which issued as U.S. Pat. No. 6,223,122 on Apr. 24, 2001, which is a continuation of U.S. Ser. No. 09/188,153, filed on Nov. 4, 1998, which issued as U.S. Pat. No. 6,047,236 on Apr. 4, 2000, which is a continuation of U.S. Ser. No. 08/701,586, filed on Aug. 22, 1996, which issued as U.S. Pat. No. 5,839,088 on Nov. 17, 1998.

BACKGROUND OF THE INVENTION

The field of this invention is geographic location referencing systems.

A geographic location system has an addressing scheme that allows a location to be uniquely addressed. Several systems are well known and currently in use, such as geodetic latitude and longitude, Universal Transverse Mercator (UTM), Military Grid Reference System (MGRS), World Geographic Reference System (GEOREF), Maidenhead, Trimble Grid, Trimble Atlas, and Thomas Brothers Detail. These known systems can generally be divided into two categories: global and local. The global systems, such as geodetic latitude and longitude, UTM, MGRS, GEOREF, Maidenhead, and Trimble Grid, use a scheme that subdivides the globe into areas of increasing resolution, until a particular location is properly identified. Thus each location address is referenced to the global system, allowing for the easy comparison of two location addresses. However, the addresses tend to be complicated, cumbersome, and unrelated to the real world, increasing the complexity of these systems.

The local systems, such as Thomas Brothers paper mapping systems, provide a technique that assigns location addresses based on association with a geographic region or physical map pages, with every location identified with only one region. This type of local system is easier to use for local location information in connection with a physical map, but is difficult to use with respect to a more global or electronic systems, as there is no simple way to convert a local address into a global address, and the local address is not recognized in the global systems.

Location technology has been significantly impacted by the wide availability of Global Positioning Systems (GPS), which are operated by the United States Department of Defense to provide worldwide navigation, position location, and precision timing services. GPS comprises a global network of satellites that interact with a controller coupled to a GPS receiver, allowing the controller to precisely determine its location. This location is typically output from the GPS receiver as latitude and longitude numbers, which are cumbersome for users to understand and use. A GPS receiver is sometimes coupled with additional capability that allows the raw latitude/longitude numbers to be converted into a more useful and usable format. See, e.g., Sprague et al., U.S. Pat. No. 5,422,814, Inoue, U.S. Pat. No. 5,289,195, and Yamashita, U.S. Pat. No. 5,471,392. However, even with these enhancements, a problem with these systems is that they are still difficult to use by persons who are unskilled in the use of location referencing systems. Another problem is that these systems are unwieldy because they still retain their global character. Thus, what is needed is a referencing system that can be used with a minimum amount of reading, scrolling, and searching, and with a limited number of keystrokes for data entry. Also needed is a user-friendly, truly local addressing system that is easily convertible to a known global system for wide-range concerns.

SUMMARY OF THE INVENTION

The present invention relates to creating and using a location referencing address method associated with an established geographic information system. The location referencing address method has an arbitrary local referencing system that retains a known relationship with a global referencing system.

In a first, separate aspect of the present invention, a universal location address is defined by subdividing a geographic location into several independent districts, each with a name and a reference point. The reference point has a known locational address within a global referencing system. A coordinate system is placed on the district relative to the reference point, yielding a position indicator for locations within the district. Combining the district name and the position indicator defines the local location.

In a second, separate aspect of the invention, the foregoing aspect may be further enhanced by the creation of proprietary locational addresses. A proprietary address is a name, which will be unique within the district, that distinctly identifies a location with the district. A proprietary address is created by selecting a name, capturing positional information about the location associated with the name, checking that the name is unique in the district and storing the name with its associated locational information and feature data. Once stored, the name and the associated information may be selectively disseminated to users of locational systems.

In a third separate aspect of the invention, a locational system first accepts regional or positional information to determine a general location address, including a district name. The locational system then accepts specific addresses, each having lens than a complete locational address. The locational system creates a complete locational address by combining the known general positional information with the abbreviated specific locational address to determine the precise and complete locational address, generally by prefixing the known general positional information to the specific locational address.

In a fourth separate aspect of the invention, a navigational system incorporating the foregoing aspects is defined.

BRIEF DESCRIPTIONS OF THE DRAWINGS

FIGS. 8a-8b, 9, 10a-10c, 11 are examples of specific files used in one implementation of the subject invention.

DESCRIPTION OF THE PREFERRED EMBODIMENTS

A preferred embodiment of the present invention allows a point of interest (POI) within an arbitrary geographic area to be uniquely identified with a locational address, and the locational address to be related to other known global referencing systems. The locational address may take two forms: first, as a universal locational address (ULA); or second, as a proprietary locational address (PLA). Each of these forms is discussed below.

Every location in a geographic area will have at least one ULA. To determine the ULA of a point, a geographic area is divided into several districts. The districts may be of differing size and shape, and may contain a particular identifying feature. For example, the geographic area of the United States may be subdivided into numerous districts, which may be strategically located, sized, and named with reference to cities or other geographic or political features in order to associate the districts with such features. Advantageously, such districts are chosen relative to cities and it is therefore convenient to name each district according to the city about which the district is located. In fact, each city may have a reference point, allowing local locations to be addressed relative to the local city. Sparsely populated areas may have larger districts, and densely populated areas may have smaller districts. The districts may also be quasi-rectangular, following latitude and longitude lines. In more densely populated areas, it is possible that a particular location will be within the boundaries of two or more districts. In addition, user-defined districts, reference points, and grid sizes are possible. For example, a search and rescue operation may establish a reference point and grid size convenient for a particular search area, or a group of hikers may choose a reference point and grid size appropriate for a particular outing.

Figure 1:
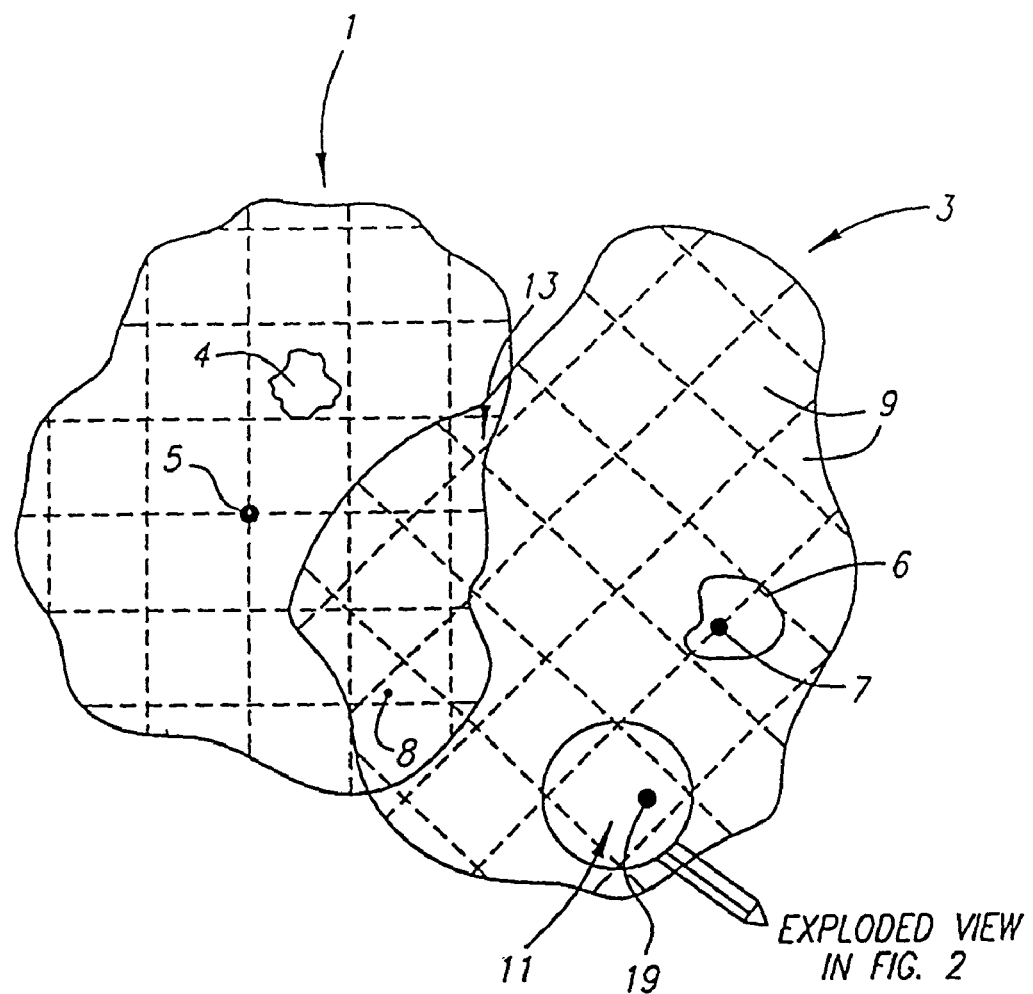
FIG. 1 shows two overlapping districts, each with a reference point and a grid system.

After the districts have been selected and named, a reference point is chosen for each district, and a grid system placed relative to the reference point. Advantageously, the grid system is referenced north. Referring to FIG. 1, a first district 1 and a second district 3 are defined relative to major cities 4 and 6 respectively. In this example, major city 4 in the first district 1 will be named CITYONE and the major city 6 in the second district 3 will be named CITYTWO. For convenience, the first district 1 will be named CTY1, referring to the major city within that district's borders, and the second district will be named CTY2, referring to the major city within that district's borders. Reference point 5 is selected as the reference point for CTY1, and reference point 7 is selected as the reference point for CTY2. The reference point will not necessarily be located proximate to the feature used as the name for the district. Each reference point 5 and 7 has a known address within a global referencing system such as World Geodetic Systems (WGS). Association with a global system offers at least three important functions: first, local addresses may be easily converted to global addresses and vice-versa; second, inter-district relationships are established; and third, easy integration with known navigational systems is provided. Thus, an easy to use district-level addressing system retains the advantages of a global system without attaching complexity.

As can be seen in FIG. 1, the grid system about each reference point 5 and 7 creates cells 9 in each district. Each of these cells 9 is identified with a cell code, which advantageously is a two character number. For example, a target POI location 19, which is in cell 11, can now be identified by referring to its district and cell code, e.g., CTY2-11. Of course, such a reference lacks the resolution to identify a particular feature, such as a house, but may be enough resolution to locate a lake or park. The issue of increased resolution is discussed below.

Also, it is likely that there will be an overlap area 13 that is formed at the intersection of districts. Within this overlap area 13, any POI can be identified by reference to any district within which it is located. Thus, a target location 8 in the overlap area 13 can be identified by either association with the CTY1 or CTY2 districts, or any other district within which it is located. In the preferred embodiment, a locational system can provide a locational address relative to any reference point or district by simply toggling between reference points.

Figure 2:
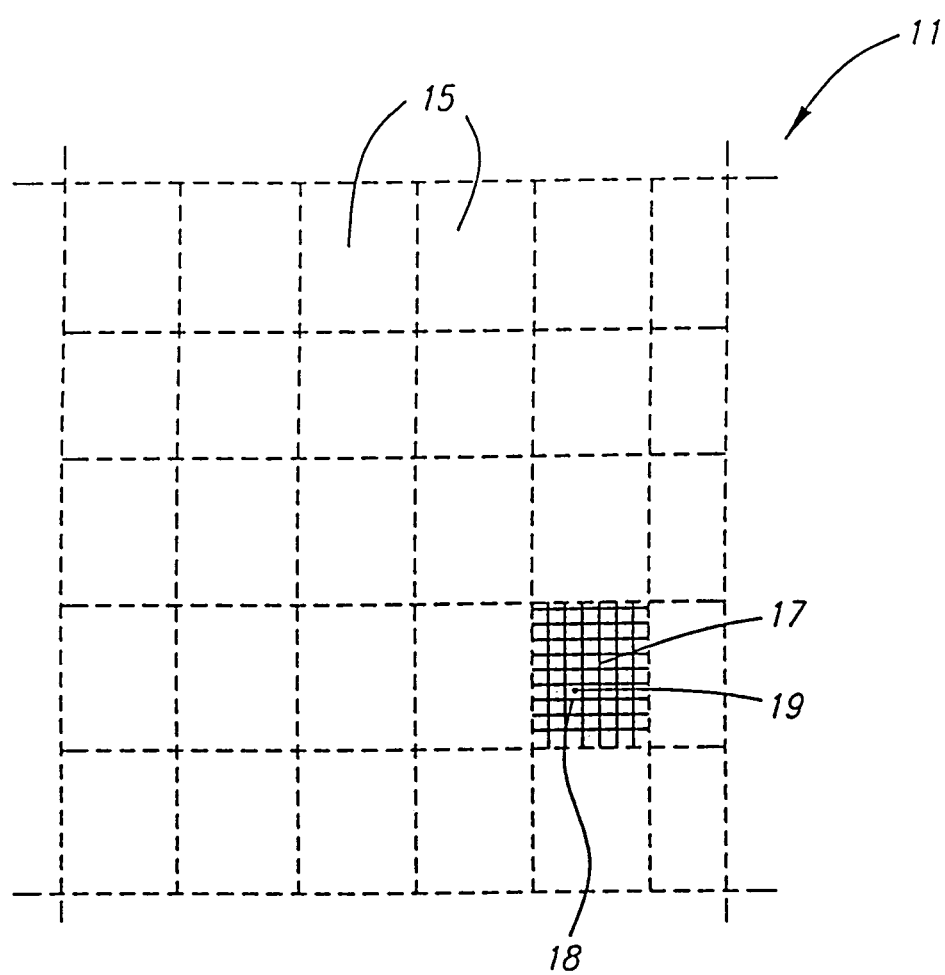
FIG. 2 shows a single cell of FIG. 1 with hierarchical gridding to increase the addressing resolution.

As discussed above, a district name and cell code may not give sufficient resolution to locate specific locations. To increase resolution, a hierarchical grid is applied to each cell 9 of FIG. 1. For example, cell 11 is shown in FIG. 2 with a sub-grid applied, producing sub-cells 15. Each of these sub-cells can be identified with a sub-grid code. Moreover, the sub-cells can be further subdivided to increase resolution. Here, sub-cell 17 is further subdivided. As can be seen in the figure, the target location 19 is within the sub-sub cell 18. Thus, to more definitively identify the target location 19, a ULA is formed from the highest resolution sub-cell defined and each of its parent cells. The locational address is formed by appending to the district name each sub-cell code in hierarchical progression, moving from lower resolution to more resolution. In the example here, the target location 19 would have a locational address of CTY2-11-17-18. Based on the size of the district, if this does not give the necessary resolution to properly locate the target location 19, then additional levels of gridding hierarchy can be added. Although, in this example, each cell was randomly named with a unique numerical code, it should be appreciated that a consistent Cartesian coordinate system can also be used, with each cell defined by an (X, Y) coordinate pair. Those skilled in the art will recognize several other alternative ways to define a grid system.

Advantageously, a city will be named with a specific abbreviated name for purposes of navigating to and around that city. That abbreviated name may also serve as the name of the defined district located about that city. Depending on the size of the city and various geographic, political, and other features relating to the city or region, the district for that particular city will be pre-defined with a particular grid size, although the system may allow altering the grid size for particular purposes. If, in the preceding example, the defined grid size for CTY2 is approximately 30 by 30 nautical miles, identifying two hierarchial grids produces a resolution of about 500 meters, which is sufficient for locating structures in open areas or large targets such as lakes or parks. By adding a third and fourth hierarchical grid, a resolution of about 5 meters is achieved, and by adding a fifth hierarchical grid, a resolution of about 0.5 meters is achieved. By adjusting the number of grids, then, the resolution of the resulting locational address is changed to meet the requirements of the particular area or user. Advantageously, each level of the hierarchial address is separated by a decimal point. Thus an address may appear as "DISTRICT.12.34.56.78". Those skilled in the art will recognize several alternatives to this approach.

Figure 4:
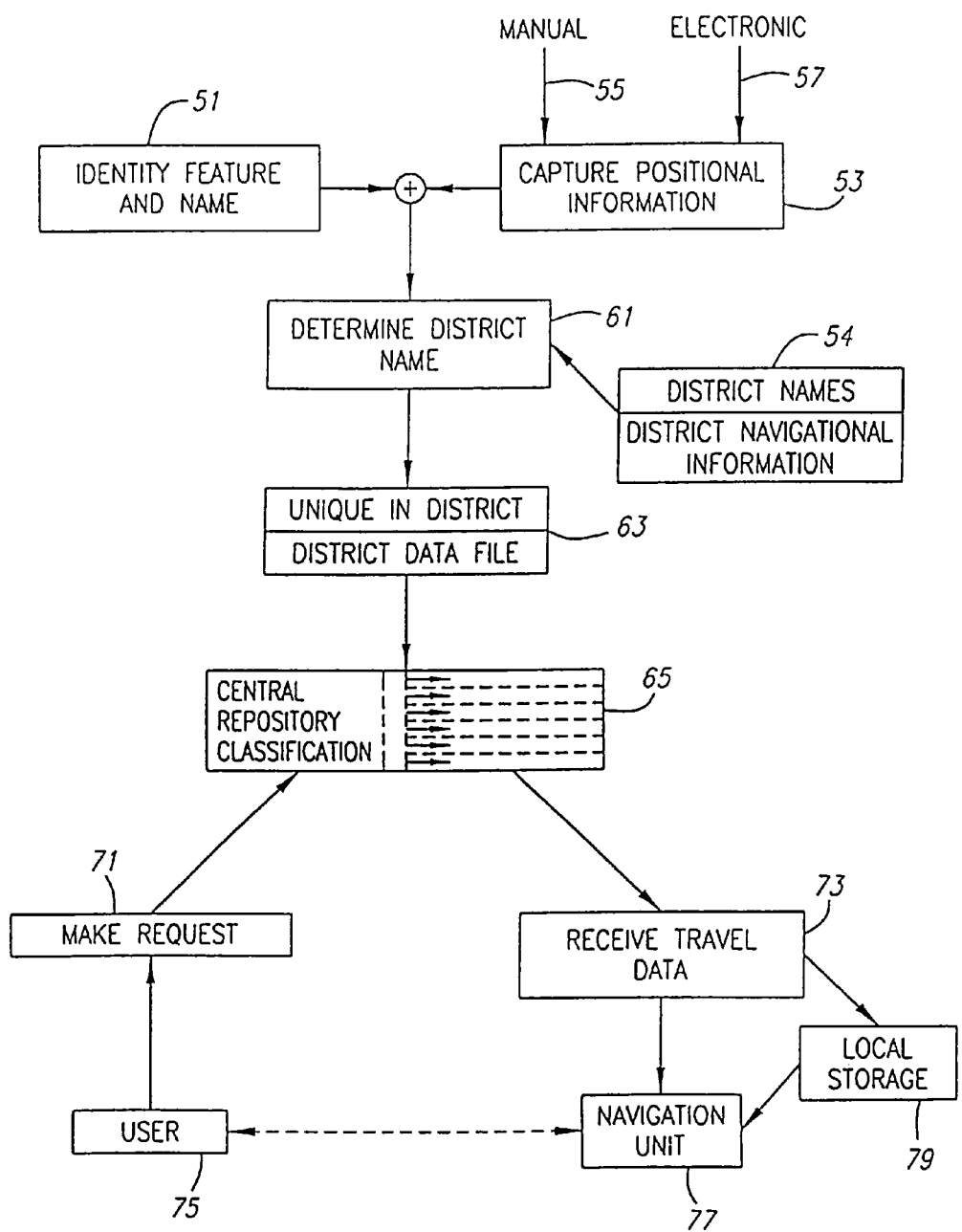
FIG. 4 shows how proprietary locational names are compiled and distributed.

The second way a point of interest may be designated in the subject invention is with a proprietary locational address (PLA). Referring to FIG. 4, the first step in using a PLA is to identify the feature and select a name 51. A PLA is a name chosen to identify a physical structure or location. The name can be chosen by the operator of a locational service, as in the case of naming national monuments, or the name can be chosen by individual or corporate users of the locational service. Individuals may even want to identify their homes using their own names. Thus, a Ms. Mary Smith may name her house MARY.SMITH.HOUSE, for example. Thus, when Ms. Smith wants to direct someone using a locational service to her house, she identifies her location using MARY.SMITH.HOUSE, rather than a street address or other locational referencing system. A corporation, too, may desire to allow customers to locate it using a common name rather than a less personal addressing system. For example, a natiowide enterprise such as MacDonalds™ with many locations may choose a PLA that is associated with its tradename or product or otherwise allows users to easily remember and associate the establishment's PLA. Abbreviations are useful as it keeps user input to a minimum, increasing safety, reliability, and convenience. Since the nation-wide enterprise may have many locations in a single metropolitan areas, each may be identified by appending to the enterprise's PLA a unique identifier to identify specific branch offices or affiliates. Wildcard searching is also provided, allowing several locations of the known nation-wide enterprise to be found for a particular geographic area.

The capture of positional information for a certain name will now be described. Referring to FIG. 4, as indicated by identifying numeral 55, positional information could be entered manually, by, for example, inputting the ULA or coordinates of the location from a known mapping system. Alternatively, as indicated by identifying numeral 57, the positional information may be read electronically using a system such as the GPS. Referring again to FIG. 4, the name 51 and positional information 53 are associated. The district in which the location is identified is determined by comparing the positional information 53 to stored district locational information 54. Once the district is identified, the name is checked against other reserved names in the district to assure the selected name is unique. If the name is unique, it is placed in a district data file 63. As can be seen from the discussion above, uniqueness of the name need only be checked at the district level. Consequently, the same name can be present in different districts. The name must be unique at the district level as the district name usually becomes part of the PLA. For example, the nation-wide enterprise location in district CTY1 could have a full PLA of CTY1-TRADENAME. If the owner of a name desires more widely reserve a name, each district will be checked individually.

Once a PLA is approved for an individual, corporation, or other entity, the PLA may be placed in promotional material such as advertisements, coupons, billboards, or other means of communication. By providing a PLA that describes a feature, a particular location may be quickly identified and readily found.

Once cleared for conflicts, the name, positional information, and any other useful information are stored in a central repository location. This storage may be sortable and selectively downloadable by users of locational systems. For example, the central repository may be accessible via the Internet. In such a case, a user 75 would make a request for information 71 concerning future travel, such as the ULAs or PLAs of specific desired waypoints of a trip. The information in the central repository 65 is selected and sorted, and the travel data 73 is received by the user, creating a travel profile. To ease the data selection process, the central repository may store preferences for the user. After receiving the travel profile, the user places the travel data 73 into a navigational unit 77, augmenting information 79 already locally present in the navigational unit 77. The user 75 may then use the travel data 73, including PLAs and ULAs, to assist in navigating.

Figure 3:
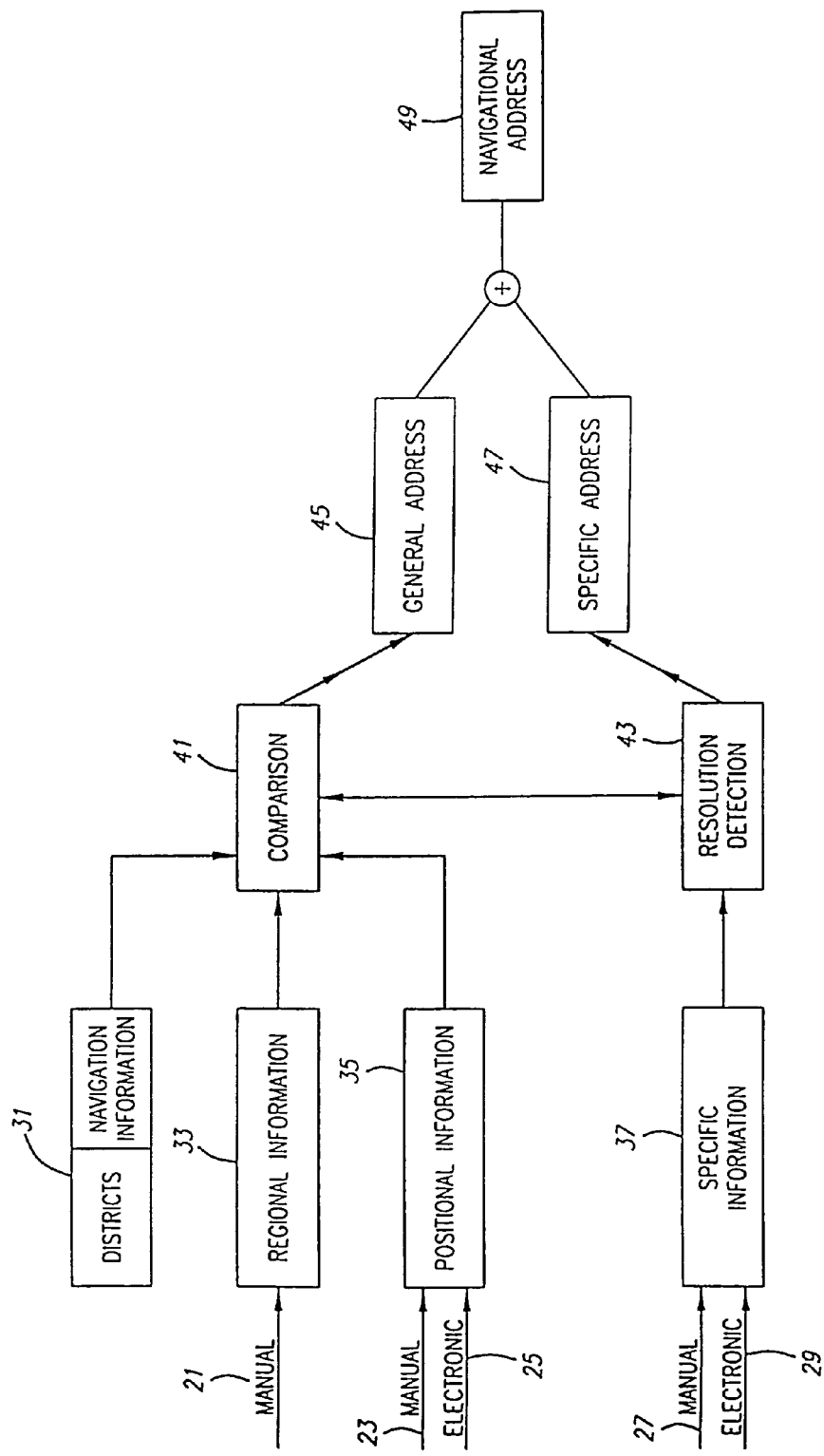
FIG. 3 is a functional diagram of a preferred embodiment of the invention.

An aspect of the subject invention is the use of ULAs and PLAs in known navigational systems. The use of a ULA by such a system with a minimum amount of information input by a user will now be disclosed. Referring to FIG. 3, district file 31 is maintained correlating district names and locational information relating to those districts. Regional information 33, that may be manually entered (as indicated by reference numeral 21) by a user, may also be maintained. This regional information 33 is used by the system to reduce the amount of information a user must enter to identify a particular location. The regional information may, for example, be a map code or distinct name identifying the general area covered by the map. Alternatively, it may be the name of a district having a pre-defined grid. After the map code or district name is inputted as regional information, the system now assumes that any future user inputs are within the geographical area defined by the regional information, thus reducing the complexity of inputting future addresses referenced on that map. Also, positional information 35 of a current location may be input manually (reference numeral 23) or electronically (reference numeral 25) for the same purpose. By knowing the present location, the system may assume that any subsequent address input by the user is within the same geographical area as the present location. Again, the purpose and effect is to reduce the complexity of inputting locational addresses.

The user may also electronically (reference numeral 29), or manually (reference numeral 27) input a specific address 37 to the system. By comparing the regional information 33 and positional information 35 of the current location with the stored district information 31, a general address can be formed. This general address will contain the district name plus any cell and sub-cell codes that are more general than the most general code in the specific address. The resolution detector 43 attempts to determine how much resolution is represented by the specific address 37 input by the user, and in conjunction with the comparison 41 function, creates a general address 45 with the correct level of resolution. Again, it is assumed that any subsequent addresses input by the user are within the same geographical area defined by this general address.

Once the resolution of the specific information 37 is determined, the specific information 37 is passed on to become a specific address 47. This specific address 47 is appended to the general address 45 formed above to form the final location address 49. The locational address 49 is then used by the navigational system to assist in navigation. Additionally, an emergency mode may be provided in which a present location is automatically referenced to any reasonably close PLA or other known location.

A relationship with World Geodetic System 1984 (WGS-84), allowing locational addresses to be converted to other global addressing systems, is also provided. A further description of the district grid is needed to understand this relationship. Each district has a reference point, with the reference point being the approximate center of the city used in naming the district. A grid is placed in relation to the reference point such that the origin of the grid is aligned with the nearest intersection of latitude and longitude lines corresponding to the largest grid resolution in the district. Since the reference point has a known WGS-84 address, by knowing that origin offset, the district rotation, and the district scale, every ULA can be translated into a WGS-84 address, and from there into nearly all locational reference systems. Conversely, every WGS-84 address may be translated into one or more ULAs. The translation is simplified in the subject invention as the district grid system is generally aligned to the WGS-84 latitude/longitude grid.

Figure 5:
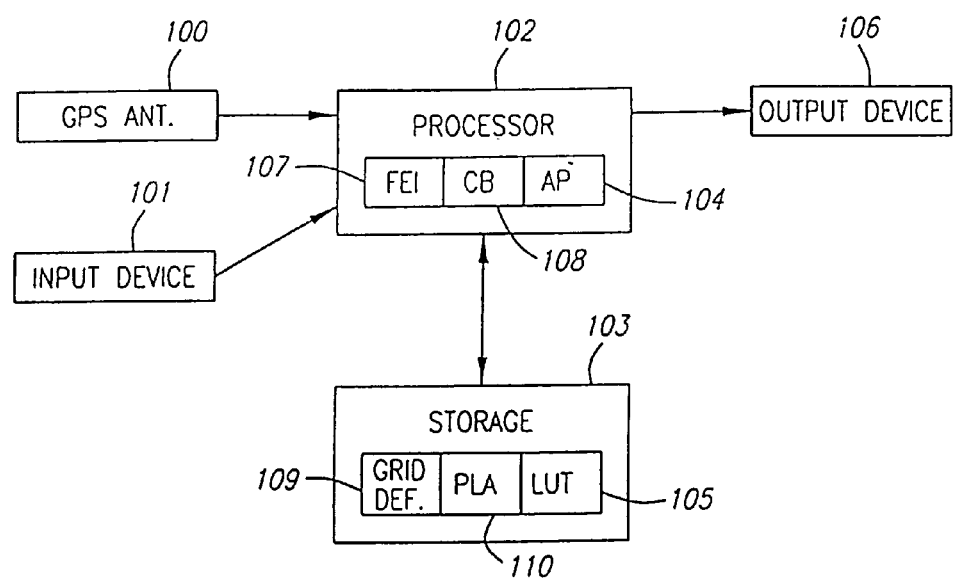
FIG. 5 is a diagram of a navigational system incorporating one or more aspects of the subject invention.

With reference to FIG. 5, such a system comprises a GPS receiver 100, an input device 101 such as a keypad or the like, a processor 102, a storage device 103 such as RAM or ROM, and an output device 106 such as a display. The GPS receiver 100, input device 101, storage device 103, and output device 106 are all coupled to the processor 102 as shown. An application program 104 executes in the processor to perform various tasks. Optionally, a look-up-table (hereinafter "LUT") 105 is provided in the storage device 103.

The application program in a conventional navigational apparatus typically interfaces with and directs the aforementioned elements to perform the following tasks:

1. Displays the latitude and longitude (hereinafter "lat/lon") of the unit—First, the GPS receiver receives signals from the GPS satellite constellation, and calculates the location of the unit (in terms of lat/lon) using these signals. The lat/lon coordinates of the unit are then displayed on the output device 106.
2. Displays velocity and bearing—if the unit is moving, the processor determines the location of this unit at selected time intervals, and based thereon, determines velocity and bearing. Once determined, this information is displayed on the output device 106.
3. Allows for the selection of waypoints—In one approach, a user inputs waypoints through input device 101 in terms of lat/lon coordinates. In another approach, common in the aviation community, a look-up-table or the like, identified with numeral 105 in FIG. 5, is provided, correlating pre-determined waypoints with lat/lon coordinates. A capability for searching through the database and selecting particular waypoints is also provided in this approach.
4. Displays distance and bearing from selected waypoints—once the waypoints have been determined, the distance (assuming straight line) and bearing from these waypoints is determined and displayed.

Additional components of the system which are added by the subject invention include context buffer 108; front-end interface (hereinafter "FEI") 107; PLA database 110; and a database(s) 109 of grid definitions.

A critical function of the front-end-interface is to convert ULAs and PLAs into lat/lon coordinates. Consequently, a user can input waypoints in terms of ULAs or PLAs, and the FEI will convert the same to lat/lon coordinates for use by the unit in determining a directional and/or distance indicator (such as distance and bearing) from the waypoints. Additionally, positional information defined in terms of lat/lon coordinates can be displayed in terms of one or more ULAs of the subject invention. The FET also includes various searching capabilities to allow a user to search through the PLA database 110 for particular waypoints or waypoints with particular characteristics.

The function of the context buffer 108 is to define the current district and grid in which grid addresses are assumed to be defined.

The grid definition file(s) 109 specifies all the grids which have been defined to date. For each grid, all the parameters necessary to define the gird are stored. Such information includes the lat/lon coordinates of the reference point of the grid, the dimensions of the grid, and the rotation and scaling of the grid cells. Thus, all the information needed to convert between a grid address within the grid and lat/lon coordinates is provided.

The PLA file 110 is a file which for each district correlates each PLA which is unique to and has been reserved for use in the district with its corresponding grid address.

The navigational system described above may be mounted in a vehicle or contained in a portable device, for example. Additionally, the navigational system may stand alone or may be integrated into existing devices, such as portable phones. Further, the subject invention may be incorporated into a general computational device such as a microprocessor. Since the physical manifestation of the navigational system is so flexible, there are numerous foreseeable applications.

DETAILS AND EXAMPLES OF SYSTEM IMPLEMENTATION

The examples set forth below describe various details of various implementations of the system. Examples 1, 2, and 3 demonstrate specific implementations of one embodiment of the invention: Example 1 demonstrates the use of Hierarchial Identifiers for districts which are correlated with Country, State/Providence, and City districts along with PLA's and a purely numeric ULA grid referencing system based upon a district grid size of approximately 185 kilometers north to south. Example 2 demonstrates the use of the Hierarchial Identifiers described in Example 1 along with an alternating alpha-numeric ULA grid referencing system. Example 3 demonstrates the use of a smaller City Grid and the resulting higher precision at various grid levels.

Example 1

Hierarchical Identifiers For Country, State/Province, City

The example assumes the existence of higher levels of hierarchical codes for identifying countries, states/provinces, and cities. The top level codes can be used, implied by context, or specifically ignored by the use of dots (periods) to make it clear how many codes have been omitted. A code of 'US.CA.LA' might be represented as 'LA', '..LA', or by 'CA.LA', depending on the geographic context or the need for clarity.

In all cases, upper level codes are dropped when the geographic context is clear, to prefix with dots (periods) when necessary to insure clarity, and to append lower levels to add precision.

Country Codes

Top level: two alpha character mnemonic (possibly based on Internet domain codes).
 Examples:
 United States=US
 Australia=AU
 Canada=CA State/Province Codes Second level: two character mnemonics (advantageously based on US postal codes within the US).
 Examples:
 California=CA
 New York=NY City Codes Third level: two or three alpha character mnemonics from city name unique within each state.
 Examples:
 Carbondale=CAR
 Hartford=HAR
 Los Angeles=LA
 New York City=NYC Proprietary Codes Fourth level: one or more alpha or numeric characters which are unique within a specific grid or map with a unique map code Examples:

MACD, DISNEY, EXXON, etc.

An example of a use of a PLA might be US.GA.ALB. .MACD to refer to a MacDonalds in Albany, Ga.; US.GA.ALB.MACD* to refer to the closest(s) one in Albany, Ga.; or MACD* to refer to the closest(s) one in any city.

The code .. ALB.MACD* could refer to either the nearest MacDonalds in Albany Ga. or Albany N.Y. and context. .NY.ALB.MACD* would resolve the context.

City Grid

This optional code is at a fourth or fifth level; identified by the first use of a pair of numeric characters in the city grid code. The city grid system requires an approximate city centroid described in a locational reference system such as geodetic latitude and longitude and the meaning of each pair of grid designators. The city grid origin is defined at the southwest coordinate system intersection value corresponding to exact values of the largest grid resolution precision that is defined in the city grid, placing the district centroid within the center grid cell of the system.

In the nominal city grid system, the grid cells are orthogonal to the defining coordinate system; however, rotations and scale parameters can be used to re-define the relationship between the city grid and the reference frame. False easting and false northing offsets (translations) are normally used to avoid negative numbering or to allow convenient ordering of alphanumeric designators.

Conversion from the defining reference frame (e.g., lat/lon) to city grid designators (i.e., ULAs) is accomplished by computing conversion constants based on the initial reference frame and the specific city grid definitions. When geographic context has already been established, grid designators are computed with respect to the currently selected district. When no district has been selected as the preferred one, the nearest district centroid is used as the basis for the grid designators. Conversion from city grid to coordinates in the defining system is accomplished by applying translation (and when applicable rotation and scale) parameters to the succession of grid designators until the precision implied by the number of grid cell designator pairs is reached.

The city grid is nominally based on a locational reference system that can be tied to other reference systems. In the nominal system, the underlying locational reference system datum is the World Geodetic System 1984 (WGS-84). Geodetic coordinates with respect to this datum can be converted to coordinates in a large number of other reference systems, allowing the city grid designators to be used with respect to other systems and other geodetic datums allowing conversion to Universal Transverse Mercator (UTM) systems, State Plane Systems, National Grid Systems, other horizontal coordinate system, or map projection.

The city grid origin is defined at the ten minute of latitude and ten minute of longitude intersection nearest the city centroid. This places the origin within five minutes of latitude and longitude of the city centroid. The radical distance of the city grid origin is then always within about 10 km of the nominal city center.

Each grid is then defined based on this origin by placing a grid centered at the origin with a false easting and northing=halfway between minimum and maximum numeric characters. Grid cells are identified by an easting cell designator paired with a northing cell designator with successive pairs of designators defining grid cells of increasing precision.

Highest level; least precision two numeric characteristics, East is always first, North is always second, minimum is always 0 and maximum is always 9.

The false easting puts the division between 4 and 5 at the grid origin north and east. Each highest level grid consists of a ten by ten region (100 grid rectangles).

Next lower level; higher precision, divides each numeric grid into a ten by ten grid (100 grid rectangles) area. East is always first, north is always second. Minimum is always 0 and maximum is always 9.

The false easting again puts the grid rectangle center at the division between 4 and 5.

Next lower levels repeat the numeric code above dividing each higher grid rectangle into a ten by ten rectangle area.

If each city grid origin is at an integer intersection of an even ten minutes of latitude and longitude, the first level numeric grid rectangles each cover an area of approximately 100 square nautical miles, or about 343 square kilometers with grid cells whose north-south extent is about 18.5 kilometers. Thus the entire set of first level grid cells covers a distance of about 185 kilometers from north to south and a shorter distance from west to east, depending on latitude.

Each second level city grid cell is $1/10^{th}$ of the next higher level grid cell, or 1 minute of latitude and longitude, about 1850 meters north to south.

Each third level city grid cell is then $1/10^{th}$ of the second level grid, or 6 seconds of latitude and longitude, about 185 meters north to south.

Each fourth level city grid cell is then $1/10^{th}$ of the third level grid, about 18.5 meters north to south, around 340 square meters.

Since this fourth level grid corresponds to a resolution some five times more precise than un-aided GPS accuracy (with Selective Availability), a fifth level grid may not be required. Following the same $1/10^{th}$ rule as the higher level grids, a fifth grid cell would measure 1.85 meters on a side, well within the accuracy of differentially-aided GPS.

Cities close to each other can each employ their own city grid even when they overlap. When questions of which city grid occur the city code (or all the higher level codes) can be attached to remove ambiguity.

An example of a use of a ULA might be US.GA.ALB.13 to refer to an area about 20 kilometers wide southwest of the center of Albany Ga. Then ..ALB.13.78 would refer to an area about 2 kilometers wide near the northest corner of the previous example. So would .13.78 if the geographic context was established as Albany Ga.

The code .US.GA.ALB.13.78.27.14 would refer to the smallest unit of about 9 meters within an explicitly defined place. ..78.27.14 would refer to the same place in context.

Example 2

In addition to the example above which demonstrates the logic and structure of the XYZ.12.34.56.78 format, this example describes the use of a grid format and ULA utilizing the XYZ.12.aa.34.aa format. The Country, State/Province, City and Proprietary Codes remain as described in the previous example, but the optinal City Grid is structured differently. The grid code is still initially identified by a pair of numeric characters, and the city grid origin is defined at the ten minute of latitude and ten minute of longitude intersection nearest the city centroid as in the previous example. The definition of each grid and the false easting and northing, as well as the structure of the first grid level, is also as described in the preceding example.

The next lower level of the grid divides each numeric grid into a twenty by twenty grid (400 grid rectangles) area. East is always first, north is always second. The minimum is A from a character set consisting of ABCDEFGHJKLMN-PQRSTUV, and the maximum is V. The false easting puts the grid rectangle center at the division between K and L.

The next lower level repeats the numeric code as described in the preceding example dividing each higher grid rectangle into a ten by ten rectangle area, and the next lower level repeats the alpha code described above in this example dividing each higher grid rectangle into a twenty by twenty rectangle area.

If the city grid is the same size as the preceding example, each second level city grid square (represented by the code XYZ.12.aa) is $\frac{1}{20}^{th}$ of the first numeric grid square, 30 seconds of latitude and longitude, or about 920 meters north to south. The third level city grid square (represented by the code XYZ.12.aa.23) would result in a grid rectangle size of approximately 3 seconds of latitude and longitude, or about 92 meters north to south. The fourth level city grid square (represented by the code XYZ.12.aa.23.aa) would be $\frac{1}{20}^{th}$ of the previous city grid square size, resulting in a grid rectangle size of approximately 0.15 seconds of latitude and longitude, or about 5 meters north to south.

It should be appreciated that it is possible to define embodiments in which these higher level portions are defined in terms of either numeric or alpha characters, or alternatively, in terms of mixed alpha and numeric characters.

Example 3

This example demonstrates the different precision achievable by varying the size of the city grid of a particular district. This example uses a sample city grid designator "US.TX-.AUS.45.45.77.45," with a district centroid of 30 degrees, 17 minutes north latitude and 97 degrees, 45 minutes of west longitude for an Austin, Tex., city grid district with a district designator. "US.TX.AUS." For a city grid easting and northing resolution of 1 minute of latitude and longitude for the largest resolution grid designator pair, the grid origin would be placed at 30 degrees, 17 minutes north latitude and 97 degrees, 45 minutes west longitude.

For numeric city grid designators with no rotation or scale, and with a false easting and northing of five grid cells, the designator "US.TX.AUS.45.45.77.45" would correspond to a geodetic position of 30 degrees, 15 minute, 45.0 seconds north latitude, and 97 degrees, 45 minutes, 15.0 seconds west longitude. The precision of the smallest grid cell would be one thousandth of a minute of latitude and longitude corresponding to approximately 1.6 meters of easting and 1.9 meters of northing. By reducing the number of designator pairs the precision of the implied geodetic position is also reduced. In this example, a designator of ".TX.AUS.45.45", would refer to an area one tenth of one minute of latitude by one minute of longitude in area or approximately 185 meters north to south; "AUS.45.45.77" would refer to an area one-hundredth of one minute by one-hundredth of one minute, or approximately 18.5 meters north to south.

EXAMPLE OF USE

Set forth below are several examples of how the invention can be used. Example 4 through 7 reflect situations in which the invention may be used and provide marked improvements in function and utility over traditional lat/lon based systems. Example 8 demonstrates certain aspects of the invention related to a particular geographic area and two maps of partially overlapping areas.

Example 4

The subject invention may be used for general vehicular navigation, to drive from Los Angeles to the visitor's center at the Grand Canyon. The driver must first determine the address for the target location, and then input the address into the navigational system. There are several alternatives for locating the PLA or ULA. For example, the driver may read travel brochures that contain the ULA/PLA addresses; the driver may also review a map which contains ULA/PLA annotations; or the driver could just call the Visitor's Center and ask them for their PLA or ULA. Alternatively, the driver, using the input device, could search the PLA database to find if the Grand Canyon visitor's center has a PLA. Once the address is determined, the driver enters the PLA or ULA address into a navigational system, and the navigational system will direct the driver to the proper destination.

Example 5

Second, the subject invention may be used to direct local traffic to a particular point of interest. For example, if the driver above is traveling along a highway and becomes hungry and desires to eat at a particular fast-food chain, the driver could interrogate the system data to find any nearby chain restaurants. The driver simply queries the system for occurrences of the fast-food chain's PLA, and, since the system is—aware of its current location, the chain3 s restaurants may be listed by proximity. The driver simply selects one of the restaurants, and the navigational system directs the driver to that location. Additionally, a local restaurant may advertise a ULA or PLA for its location, so a driver, seeing a billboard or advertisement containing a ULA or PLA address, could input that address and be directed to the restaurant location. Because of the unique style of the addresses and features of the subject invention, these addresses are particularly easy to input with a minimum chance of error, decreasing the risk of accidents and increasing the likelihood of going to the desired location.

Example 6

Third, the subject invention is particularly well suited for customization by individual or team users, facilitating intra-group communication and navigation. For example, if a group of hikers desires to split up and explore a particular area, they each could set their portable navigation devices to reference a custom grid with an appropriate grid size and location for the explorable area that allows sufficient resolution with a minimum number of digits or characters. Now, as the hikers communicate with each other or record interesting locational information, the data may be easily and accurately used and referenced to a meaningful location. This ability to set a user-defined reference point and grid size would also be useful for rescue teams performing search and rescue operations by allowing the search and rescue team to instantly establish a grid size and location for any search.

Example 7

Fourth, the subject invention has emergency utility. For example, if a hiker above needs emergency assistance, the navigational system can provide a locational ULA that is easy to read and communicate by voice or numeric only key pad, which reduces both the ambiguity, risk and time involved in describing an emergency location. Alternatively, this ULA may be automatically communicated to emergency personnel if the navigational system integrates with a portable phone, two way pager, or other portable communication device.

Example 8

Figure 6:
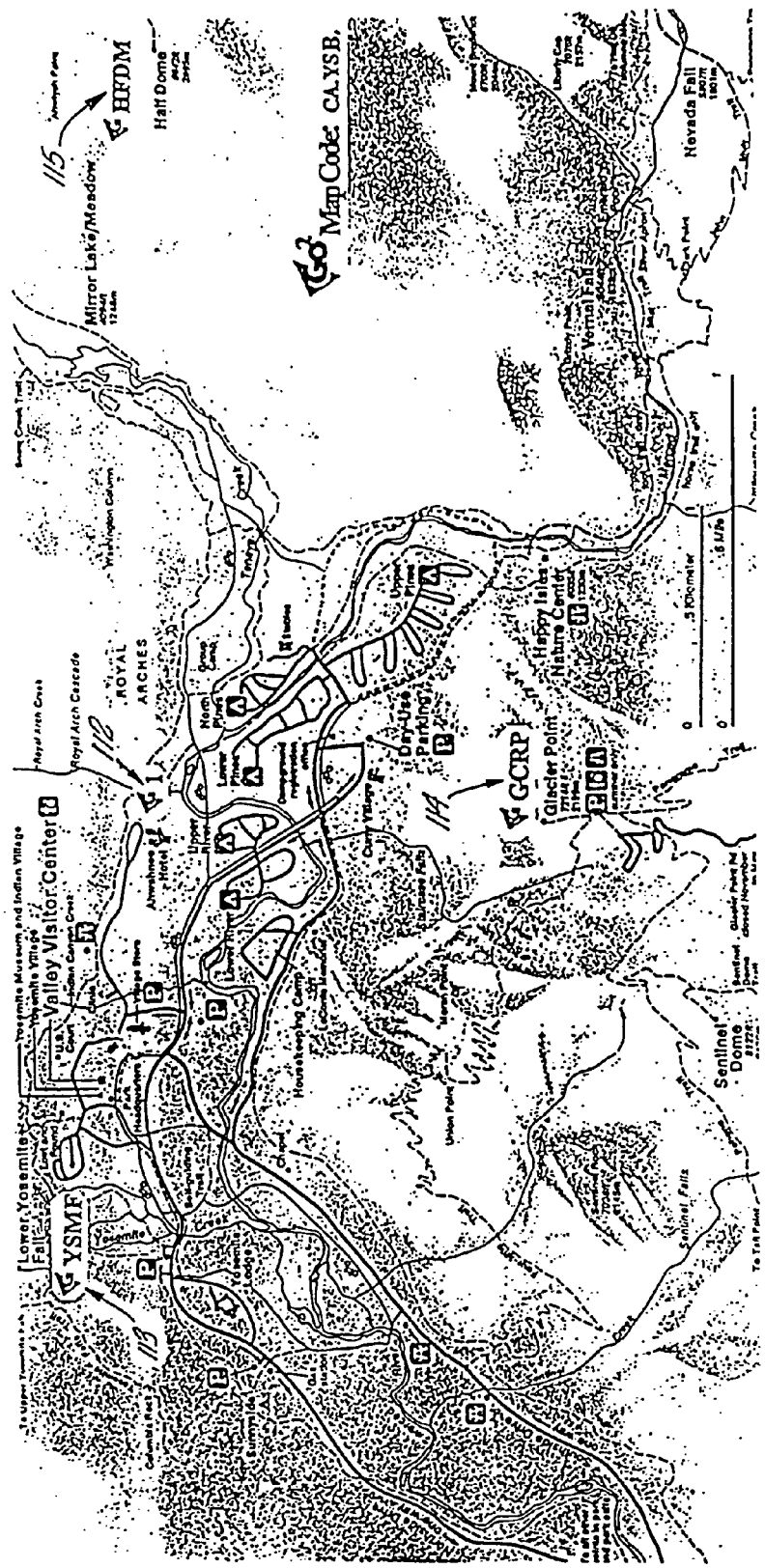
FIGS. 6 and 7 show the use of PLAs and ULAs in a specific geographical context.

An example illustrating the use of PLAs and ULAs in a specific geographical context, Yosemite National Park, will now be described. FIG. 6 illustrates a paper map with an assigned name of CA.YSB (indicated by identifying numeral 111). Within the boundaries represented on this map, the following PLAs have been reserved:

| PLA | Description of Location | Corresponding FIG. 6 identifying numeral |
|---|---|---|
| HFDM | Half Dome | 115 |
| 1 | Ahwahnee Hotel | 112 |
| GCRP | Glacier Point | 114 |
| YSMF | Lower Yosemite Fall | 113 |

Figure 7:
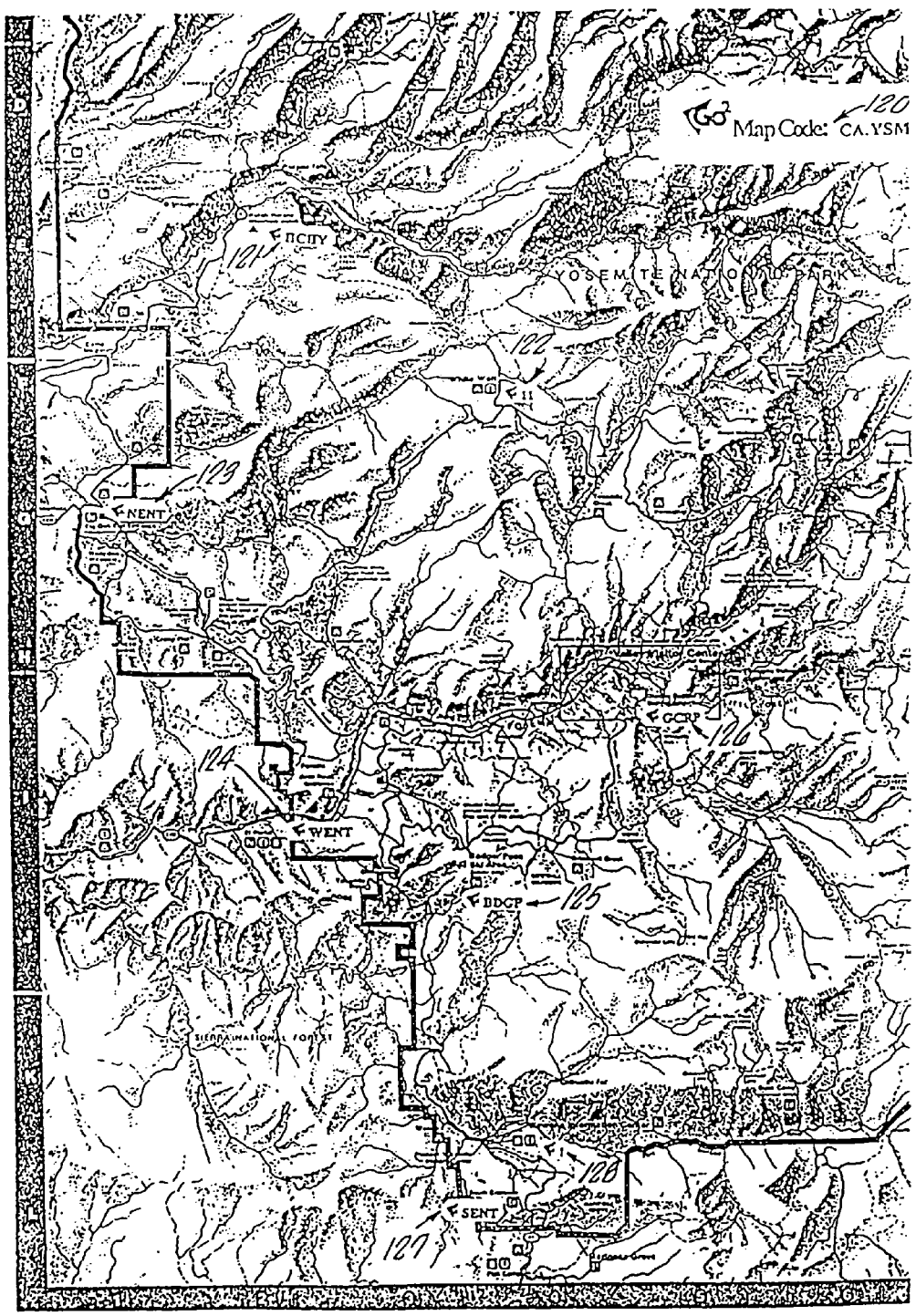

FIG. 7 illustrates a district with an assigned name of CA.YSM (indicated by identifying numeral 120). Within this district, the following PLAs have been reserved:

| PLA | Description of Location | Corresponding FIG. 7 identifying numeral |
|---|---|---|
| HCHY | Hetch Hetchy | 121 |
| 11 | White Wolf | 122 |
| NENT | Big Oak Flat Entrance | 123 |
| GCRP | Glacier Point | 126 |
| WENT | Arch Rock Entrance | 124 |
| BDGP | Badger Pass | 125 |
| 1 | Wawona Information Center | 128 |
| SENT | South Entrance | 127 |

The following points should be noted from this example:

First, the name CA.YSB is for the specific map included in FIG. 6, and not for a district in which all of the area contained on the map is included. This feature allows assignment of specific PLA's for specific maps without regard to the district, thereby providing clarity in situations where the area covered by the map overlaps one or more districts.

Second, the name CA.YSM is the name of the district in which the area included in the map in FIG. 7 is located, thereby allowing areas included within this map to be referenced by either PLAs (e.g. CA.YSM.HCHY) or ULAs (e.g. CA.YSM.32.84.23.43) without the need to re-identify the name of the district or map.

Third, the areas covered by the CA.YSM district and the CA.YSB map overlap, allowing PLA references to either the YSM district or the YSB map. (Note also that the system might also define YSB as a district which could be utilized in determining ULA's with reference to the YSB district, in which case the YSB and YSM districts would also partially overlap.)

Fourth, the PLA's for particular locations may either be identical except for the district name (e.g. GCRP in FIG. 6 and GCRP in FIG. 7 refer to the same location) or identical PLA's may apply to different locations in different districts or on different maps (e.g. "1" in FIG. 6 and "1" in FIG. 7 refer to different locations on each of the respective maps). This is consistent with the principle that a PLA need only be unique within the district in which it is defined.

All of the features described in this example are designed to allow an initial manual or electronic input (either a district code, cell code, or specific map code) which allows users to use PLA's or ULA's identified on a specific map with a minimum number of keystrokes, thereby minimizing data entry, confusion, and ambiguity.

EXAMPLES OF SOFTWARE IMPLEMENTATION

Examples 9, 10, and 11 demonstrate certain characteristics of files, pseudo-codes, and program screens of particular embodiments of the invention. (Note that the data contained in the files is provided for illustrative purposes only).

Example 9

In this example, formats of specific files that are used in one implementation of the subject invention are described. Four files are described: GO2CITY.DAT, STATES.DAT, PROPGO2.DAT, and COUNTRYS.DAT.

The GO2CITY2.DAT file, illustrated in FIGS. 8a-8b, defines the reference points for a plurality of pre-defined districts centered around specific cities. For each reference point, there is provided the name of the district, the name of the reference point, and the global coordinates of the reference point. Thus, the first entry of this file "AK.ANC, Anchorage, 149W54, 61N13," indicates that there is a district in the state of Alaska centered around Anchorage, with the reference point thereof having the following global coordinates: 149W54,61N13.

The STATES.DAT file, illustrated in FIG. 9, simply defines the mnemonics used in GO2CITY2.DAT to define states.

The PROPGO2.DAT file, illustrated in FIGS. 10a-10c, defines the proprietary names which have been reserved for each district. This file correlates each such proprietary name with the global coordinates associated with that name. Thus, the first entry of this file, "US.CA.NWB.MAC2, 117W52.360, 33N39.549" indicates that, in a district centered around Newport Beach, Calif., there is a MacDonalds having the following global lat/lon coordinates address: 117W52.360, 33N39.549.

The COUNTRYS.DAT file, illustrated in FIG. 11, simply defines the country mnemonics used in PROPGO2.DAT.

Example 10

Figure 12A:
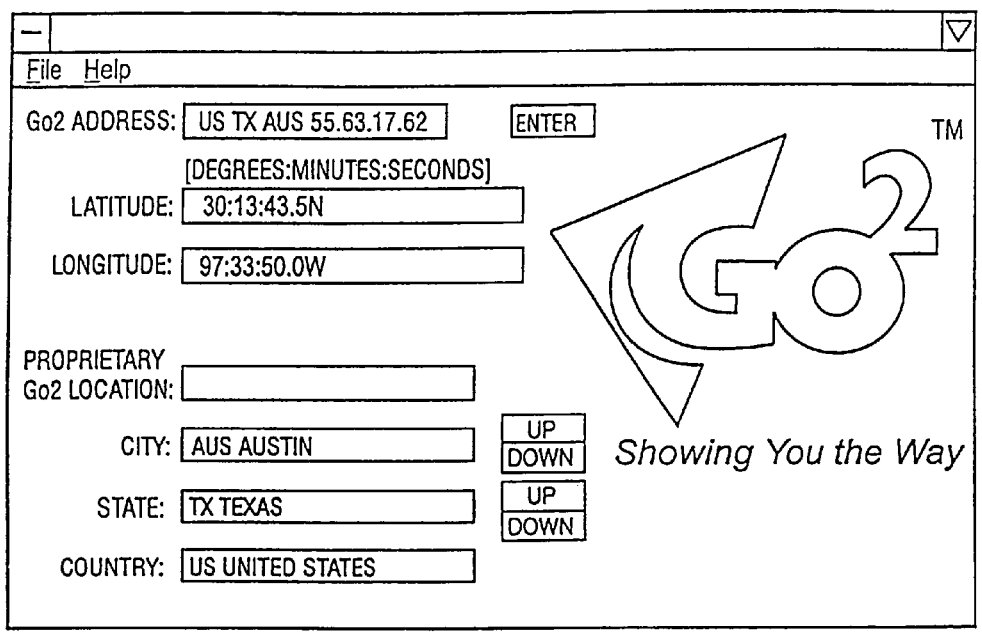
FIGS. 12a-12c are examples of screen outputs used in one implementation of the subject invention.
Figure 12B:
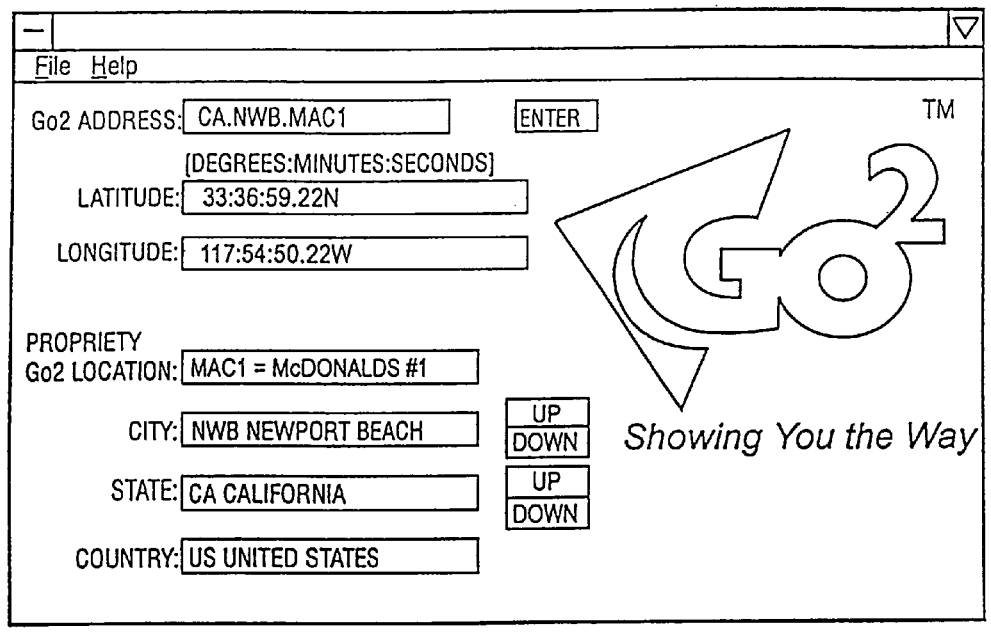
Figure 12C:
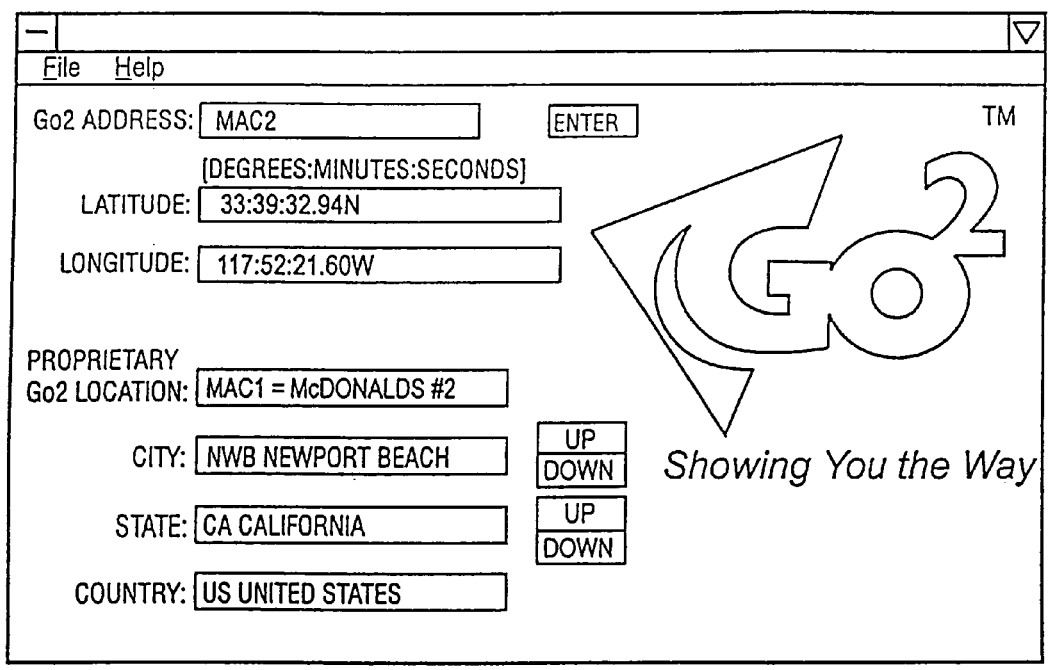

This example illustrates screen formats as displayed on an output device in an implementation of the subject invention. FIG. 12a is a screen illustrating the input of a ULA or grid address into a navigational system, with the system determining and outputting corresponding latitude and longitude coordinates. FIG. 12b illustrates the input of a PLA, with the system determining and outputting corresponding latitude and longitude coordinates. FIG. 12c illustrates the capability of the system to interpret the context, i.e. district address, of previous addresses, and to assume that the same district addresses applies to subsequent specific addresses until notified otherwise. In this specific example, the proprietary name MAC2 was input, with the system assuming that the district name associated with the previous example relating to MAC1, i.e., the CA.NWB. district name, applied to this example as well. Thus, in FIG. 12c, only the identifier "MAC2" need be input to the system, it being assumed that the district identifier "CA.NWB" applies to this request as well.

Example 11

This document is a functional description of a computer program, Go2Grid, which embodies one or more aspects of the subject invention. The program is written in the "C++" programming language and its purpose is to demonstrate the feasibility of conversion between city grid and proprietary codes and geodetic coordinates.

Program flow is described using a series of pseudo-code statements. The functions required to perform these tasks are described. The data variable types and structures are defined. The parameters required for implementation of two possible city grid designators are defined.

Program Flow
Set all defined parameters to their default values
Northern latitudes are positive
Eastern longitudes are negative
The assumed geodetic datum is World Geodetic System 1984 (WGS-84)
The last geodetic position is used to initialize the City Grid designator.
The user screen is initialized
Monitor keystrokes or navigation receiver input
For any City Grid designator change
    Parse user input
    If change in City Code
        Compute city position from designator
        Fill City Code
        Fill Country and State Codes
    If change in State Code
        Fill Country and State Codes
    If change in Country Code
        Fill Country Code
    If change in entire City Grid Designator
        If a Universal Go2 Code
            Fill Country, State, City and Grid Codes
        If a Proprietary Go2 Code
            Fill Proprietary Code
    Compute geodetic coordinates for this Go2 Designator

---

For any change in geodetic coordinates
    Parse user input
    If user has requested a Universal Code
        If current geographic context is changed
            Get Go2 Codes from latitude and longitude
                Find closest city
                Set new City Grid center
                Fill Country, State, City codes
                Compute City Grid Codes for each level of precision
Reset User Screen display
Continue

---

Functions

The following functions are used by the Go2Grid sample program, an embodiment of the city grid concept;

---

| | |
|---|---|
| getdeg( ) | extracts decimal degrees from character strings |
| grange( ) | computes geodetic range between two positions |
| dmsdeg( ) | extracts degrees, minutes, seconds from decimal degrees |

-continued

| | |
|---|---|
| degdms( ) | forms decimal degrees from degrees, minutes, seconds |
| getcenter( ) | computes geodetic coordinates of City Grid center from city centroid |
| getgrid( ) | computes City Grid codes for level of precision |
| getkeys( ) | parses user keyboard input |
| parsego2( ) | parses Go2 City Grid designator |
| addlatlon( ) | concatenates next level of precision onto geodetic coordinates |
| getnextcity( ) | finds next city in current state/province list |
| getprevcity( ) | find previous city in current state/province list |
| getcost( ) | fills Go2 City Grid designator with country and state/province codes |
| putscreen( ) | fills display with current city Grid designator and geodetic coordinates |
| getnextstate( ) | finds next state/province in current country list |
| getprevstate( ) | find previous state/province in current country list |

Types and Structures
The Go2Grid embodiment sample program defines the following variable structures in addition to the usual character, integer, float, and double types:

typedef struct costruct {
    char city_code[4];
    char city[60];
    char state_code[3];
    char state[60];
    char country_code[3];
char country[60];
    char longitude[32];
    char latitude[32];
    double lat;
    double lon;
    double centerlat;
    double centerlon; };
typedef struct latlonstruct {
    int latdeg;
    int latmin;
    int latsec;
    int londeg;
    int lonmin;
    int lonsec;
};

Program Definitions
The following definitions are used within the Go2Grid sample program:
/* grid types*/
/* a gridtype=1 is numeric with 10 minutes, 1.0, 0.1, and 0.001 grids */
/* a gridtype=2 is alphanumeric with 10, 0.5, 0.05 and 0.0025 grids */
define GRIDTYPE 1
define TITLE "Go2 and Geographic Coordinate Converter"
define VERSION "(4/3/96)"
/* lines */
define TITLELINE 1
define GO2CONTEXTLINE 5
define GEOCONTEXTLINE 10
define HELPLINE 15
define MESSAGELINE 18
define COUNTRYLINE 20
define STATELINE 21
define CITYLINE 22
define GO2LINE 23
define LATLINE 24
define LONLINE 25
define INCOL 23

```
#define OUTCOL 5
#if GRID TYPE=1
    *GRID GRAIN*
    #define GRIDKIND "Numeric City Grid"
    #define GRIDDEF "Grid Precision: Level 1=1.0'; Level
        2=1.0'; Level 3=0.1'; Level 4=0.01'"
    #define GRIDCHARS "Designators Levels 1, 2, 2 and 4:
        [01232456789]"
    #define LEVEL 1_EGRAIN 10.0
    #define LEVEL 1_NGRAIN 10.0
    #define LEVEL 1_ECHARS "0123456789"
    #define LEVEL 1_NCHARS "0123456789"
    #define LEVEL 1_EGRIDS 10
    #define LEVEL 1_NGRIDS 10
    #define LEVEL 2_EGRAIN 1.0
    #define LEVEL 2_NGRAIN 1.0
    #define LEVEL 2_ECHARS "0123456789"
    #define LEVEL 2_NCHARS "0123456789"
    #define LEVEL 2_EGRIDS 10
    #define LEVEL 2_NGRIDS 10
    #define LEVEL 3_EGRAIN 1.0
    #define LEVEL 3_NGRAIN 0.10
    #define LEVEL 3_ECHARS "0123456789"
    #define LEVEL 3_NCHARS "0123456789"
    #define LEVEL 3_EGRIDS 10
    #define LEVEL 3_NGRIDS 10
    #define LEVEL 4_EGRAIN 0.010
    #define LEVEL 4_NGRAIN 0.010
    #define LEVEL 4_ECHARS "0123456789"
    #define LEVEL 4_NCHARS "0123456789"
    #define LEVEL 4_EGRIDS 10
    #define LEVEL 4_NGRIDS 10
#else if GRIDTYPE=2
    #define GRIDKIND "Alphanumeric City Grid"
    #define GRIDDEF "Grid Precision: Level 1=10'; Level
        2=0.5'; Level 3=0.05'; Level 4=0.0025'"
    #define GRIDCHARS "Designators Levels
        1&3:[01232456789]; Levels 2&4:[ABCDEF-
        GHJKLMNPRSTUVW]"
    *GRID GRAIN*/
    #define LEVEL 1_EGRAIN 10.0
    #define LEVEL 1_NGRAIN 10.0
    #define LEVEL 1_ECHARS "0123456789"
    #define LEVEL 1_NCHARS "0123456789"
    #define LEVEL 1_EGRIDS 10
    #define LEVEL 1_NGRIDS 10
    #define LEVEL 2_EGRAIN 0.5
    #define LEVEL 2_NGRAIN 0.5
    #define LEVEL 2_ECHARS "ABCDEFGHJKLMN-
        PRSTUVW"
    #define LEVEL 2_NCHARS "ABCDEFGHJKLMN-
        PRSTUVW"
    #define LEVEL 2_EGRIDS 20
    #define LEVEL 2_NGRIDS 20
    #define LEVEL 3_EGRAIN 0.05
    #define LEVEL 3_NGRAIN 0.05
    #define LEVEL 3_ECHARS "0123456789"
    #define LEVEL 3_NCHARS "0123456789"
    #define LEVEL 3_EGRIDS 10
    #define LEVEL 3_NGRIDS 10
    #define LEVEL 4_EGRAIN 0.0025
    #define LEVEL 4_NGRAIN 0.0025
    #define LEVEL 4_ECHARS "ABCDEFGHJKLMN-
        PRSTUVW"
    #define LEVEL 4_NCHARS "ABCDEFGHJKLMN-
        PRSTUVW"
    #define LEVEL 4_EGRIDS 20
    #define LEVEL 4_NGRIDS 20
#endif
```

While embodiments and applications of this invention have been shown and described, it would be apparent to those in the field that many more modifications are possible without departing from the inventive concepts herein. The invention, therefore, is not to be restricted except in the spirit of the appended claims.

What is claimed is:

1. A method for locating one or more first points of interest, the method comprising the steps of:

storing information relating to a plurality of second points of interest, the plurality of second points of interest including the one or more first points of interest;

associating with each of the plurality of second points of interest a universal locational address (ULA) that includes a district identifier and a grid reference defining a geographic location within the identified district;

associating with one or more of the plurality of second points of interest a proprietary locational address (PLA) that uniquely identifies a geographic location within a district;

receiving a request from a user for the one or more first points of interest, the request indicative of either (a) a ULA or (b) a PLA; and selecting the one or more first points of interest based upon geographic proximity of each of the second points of interest to the location indicated by the request.

2. The method of claim 1, further comprising providing to the user information about the one or more first points of interest.

3. The method of claim 1, wherein the grid reference is hierarchical, the district identifier identifying a district within a mapped area, the district being hierarchically divided into cells and the hierarchical grid reference identifying one or more cells within the district.

4. The method of claim 3, wherein each PLA has a name and a location reference, the name being unique to the district containing the geographic location identified by the location reference.

5. The method of claim 4, wherein the name is formed of one or more abbreviations.

6. The method of claim 5, wherein the PLAs are stored in a list at a central repository location that is accessible by the user.

7. The method of claim 3, wherein each district includes a reference point that has a known address within a global referencing system.

8. The method of claim 7, wherein the reference point identifies a location proximate to the center of the district.

9. The method of claim 7, wherein the global referencing system is World Geodetic System.

10. The method of claim 7, wherein two or more districts overlap.

11. The method of claim 7, wherein the reference point allows conversion of ULAs into addresses based upon the global referencing system.

12. The method of claim 7, wherein the reference point allows conversion of addresses based upon the global referencing system into ULAs.

13. The method of claim 7, wherein the reference point defines a relationship between each district.

14. The method of claim 7, wherein one or more districts are cities.

15. The method of claim 7, the step of selecting comprising:
- converting the request into a first ULA;
- determining a distance between the first ULA and each of the plurality of second points of interest within the same district; and
- selecting the first points of interest based upon the determined distances.

16. A locational system for locating one or more first points of interest, comprising:
- a storage repository for storing information relating to a plurality of second points of interest that include the first points of interest, each of the plurality of second points of interest being associated with a universal locational address (ULA) and at least one of the plurality of second points of interest being associated with a proprietary locational address (PLA);
- a receiver capable of receiving a request for the one or more first points of interest from a user, the request indicative of either (a) a ULA or (b) a PLA:
- a selector capable of selecting the one or more first points of interest based upon geographic proximity of each of the second points of interest to the location indicated by the request; and
- a transmitter for providing the one or more first points of interest to the user;
- wherein the PLA uniquely identifies a geographic location within a district, and the ULA is formed of a district identifier and a grid reference that defines a geographic location within the identified district.

17. The locational system of claim 16, wherein the grid reference is hierarchical, the district identifier identifying a district within a mapped area, the district being hierarchically divided into cells and the hierarchical grid reference identifying one or more cells within the district.

18. The locational system of claim 17, wherein each PLA has a name and a location reference, the name being unique to the district containing the location of the location reference.

19. The location system, of claim 18, wherein the PLAs are stored in a list at a central repository location that is accessible by the user.

20. The locational system of claim 18, wherein each district includes a reference point that has a known address within a global referencing system.

21. The locational system of claim 20, wherein the reference point identifies a location proximate to the center of the district.

22. The locational system of claim 20, wherein the global referencing system is World Geodetic System.

23. The locational system of claim 20, wherein two or more districts overlap.

24. The locational system of claim 20, wherein the reference point allows conversion of ULAs into addresses based upon the global referencing system.

25. The locational system of claim 20, wherein the reference point allows conversion of addresses based upon the global referencing system into ULAs.

26. The locational system of claim 20, wherein the reference point defines a relationship between each district.

27. The locational system of claim 20, wherein one or more districts are cities.

28. The locational system of claim 20, wherein the selector converts the locational address into a first ULA, determines a distance between the first ULA and each of the plurality of second points of interest within the same district, and selects the first points of interest based upon the determined distances.

* * * * *